(12) United States Patent
Lindee et al.

(10) Patent No.: US 7,159,372 B2
(45) Date of Patent: Jan. 9, 2007

(54) SHEET INTERLEAVE SYSTEM FOR PATTY-FORMING APPARATUS

(75) Inventors: Scott A. Lindee, Mokena, IL (US); Salvatore Lamartino, Orland Park, IL (US)

(73) Assignee: Formax, Inc., Mokena, IL (US)

( * ) Notice: Subject to any disclaimer, the term of this patent is extended or adjusted under 35 U.S.C. 154(b) by 52 days.

(21) Appl. No.: 11/031,876

(22) Filed: Jan. 8, 2005

(65) Prior Publication Data
US 2005/0173857 A1    Aug. 11, 2005

Related U.S. Application Data

(60) Provisional application No. 60/604,440, filed on Aug. 25, 2004, provisional application No. 60/540,022, filed on Jan. 27, 2004.

(51) Int. Cl.
*B65B 25/08* (2006.01)
*B65B 41/06* (2006.01)
*B65B 63/02* (2006.01)

(52) U.S. Cl. .................... 53/157; 53/122; 53/389.1
(58) Field of Classification Search ............... 53/122, 53/157, 389.1; 425/556
See application file for complete search history.

(56) References Cited

U.S. PATENT DOCUMENTS

| | | | |
|---|---|---|---|
| 2,877,120 A | 3/1959 | Bush | |
| 3,126,683 A | 3/1964 | Richards et al. | |
| 3,675,387 A | 7/1972 | Lekan | |
| 3,952,478 A * | 4/1976 | Richards et al. | 53/157 |
| 4,054,967 A | 10/1977 | Sandberg et al. | |
| 4,074,509 A * | 2/1978 | Miles | 53/157 |
| 4,097,961 A * | 7/1978 | Richards | 425/556 |
| 4,329,828 A * | 5/1982 | Wagner | 53/157 |
| 4,768,325 A * | 9/1988 | Lindee et al. | 53/157 |
| 4,996,743 A * | 3/1991 | Janssen | 425/579 |
| 6,368,092 B1 * | 4/2002 | Lindee et al. | 425/556 |
| 6,428,303 B1 * | 8/2002 | Lindee et al. | 425/556 |

OTHER PUBLICATIONS

Set-Up, Adjustment and Timing of the Paper Feed System, F-26C Manual, 1997, 14 pages, Formax, Inc.
Paper Feed, F-26C Manual, Jun. 10, 1993, 10 pages, Formax, Inc.

* cited by examiner

*Primary Examiner*—Louis Huynh
(74) *Attorney, Agent, or Firm*—The Law Office of Randall T. Erickson, P.C.

(57) ABSTRACT

A sheet interleave system for a reciprocating mold plate patty-forming apparatus includes a hopper for holding sheets, a shuttle, a sheet transfer device, at least one precise position controlled motor, and a drive train. The shuttle has a sheet-holding frame that is slidable between a sheet receiving position and a sheet dispensing position beneath knockout cups of the patty-forming apparatus. The sheet transfer device has a suction device for gripping a sheet from the hopper. The suction device is moveable from a position to grip a sheet from the hopper to a position to place the sheet on the sheet holding frame. The drive train is driven by one or two precise position controlled motor. The drive train is mechanically connected to the carriage and to the sheet transfer device to impart controlled motion thereto.

20 Claims, 20 Drawing Sheets

US 7,159,372 B2

SHEET INTERLEAVE SYSTEM FOR PATTY-FORMING APPARATUS

This application claims the benefit of U.S. Provision Application Ser. No. 60/540,022 filed Jan. 27, 2004 and U.S. Provision Application Ser. No. 60/604,440 filed Aug. 25, 2004.

BACKGROUND OF THE INVENTION

In many manufacturing applications, particularly in food processing, it is highly desirable to interleave the finished articles with thin, flexible sheets of paper, waxed paper, cellophane, plastic film, or other very thin, flexible material. For example, in packaging meat slices or hamburger patties, individual sheets of paper, waxed paper or like material inserted between adjacent pieces of meat prevent the meat from sticking together and preserve the integrity of the individual meat pieces. The same situation is presented with stacks of sliced cheese; the cheese slices tend to "grow" back together unless the slices are separated by sheets of thin, flexible material.

Often, in the basic processing equipment, there is some stage of operation at which the individual hamburger patties or other such articles traverse a given discharge path, usually terminating at a stacking position; the preferred technique is to suspend individual sheets of waxed paper or the like at some intermediate position on the path so that each article, moving along the path, picks up a sheet of paper and comes to rest in a stack in which the articles are interleaved one-for-one with the paper sheets.

U.S. Pat. Nos. 3,126,683; 2,877,120, 3,675,387 and 4,054,967 all describe variations of sheet interleaving machines.

U.S. Pat. No. 3,952,478 describes a sheet applicator for a patty-forming apparatus wherein the patty-forming apparatus includes a reciprocating mold plate that moves linearly from a fill position to a knock out position. At the knock out position, patties are removed from the mold plate in a downward direction though a discharge path. The sheet applicator interleaves individual, thin, flexible sheets of paper, cellophane, plastic film or like material with a series of hamburger patties or like flat, relatively thick articles as the articles traverse the discharge path in sequential spaced relation to each other, the path terminating at a stacking position.

The sheet applicator comprises a vacuum transfer shuttle which is reciprocally movable along a shuttle path between a sheet application position intersecting the article discharge path and sheet transfer position adjacent to, but spaced from the discharge path. The shuttle has a central opening which encompasses the article discharge path, through which one of the articles may pass freely, when the shuttle is in its application position. The shuttle also has a group of small vacuum grippers which are distributed around the peripheral edges of the central opening in the shuttle, just beyond the edges of an article passing therethrough.

The sheet applicator also has a sheet feeder which includes a releasable sheet holder means for depositing a single, thin, flexible sheet on the shuttle in registry with the shuttle vacuum grippers, whenever the shuttle reaches its sheet transfer position. Each thin, flexible sheet is of a size and configuration so as to cover all of the shuttle vacuum grippers.

The shuttle and the sheet feeder are mechanically linked to, and driven by, the mechanical system that drives the mold plate of the patty-forming apparatus. The shuttle and the sheet feeder are moved in synchronism with the mold plate, with movement of the articles along the discharge path and in synchronism with each other, so that the sheet holder means of the sheet feeder releases each sheet as it arrives at the transfer position in registry with the shuttle vacuum grippers, and so that the shuttle is in its sheet application position each time an article moves therethrough.

This system has been successfully commercialized for many years as a part of the FORMAX F-26 food patty-forming machine, available from Formax, Inc. of Mokena, Ill., U.S.A.

The present inventors have recognized that it would be advantageous to provide an improved sheet interleaving apparatus for a patty-forming apparatus that was not mechanically linked to the patty-forming apparatus for operational movement and that had an increased flexibility of operation and timing.

The present inventors have recognized that it would be advantageous to provide a substantially modular sheet interleaving apparatus that could be added to a patty-forming apparatus easily and cost effectively.

The present inventors have recognized that it would be advantageous to provide a sheet interleaving apparatus for a patty-forming apparatus that reduced overall maintenance requirements by reducing the number of lubrication, sealing and other maintenance points, and by making the maintenance points more accessible.

SUMMARY OF THE INVENTION

The present invention provides a new and improved sheet interleaving system and apparatus for interleaving individual thin, flexible sheets of paper, cellophane, plastic film, of like material with a series of relatively thick, flat articles such as hamburger patties, as the articles traverse a given discharge path.

The invention provides a sheet interleave system for a patty-forming apparatus that includes a hopper for holding sheets, a shuttle, a sheet transfer device, at least one precise position controlled motor, and a drive train. The shuttle has a sheet-holding frame that is slidable between a sheet receiving position and a sheet dispensing position. The sheet transfer device has a suction device for gripping a sheet from the hopper. The suction device is moveable from a position to grip a sheet from the hopper to a position to place the sheet on the sheet holding frame. The precise position controlled motor is preferably a servomotor. The drive train is driven by the precise position controlled motor. The drive train can be configured as a system of pulleys, belts, chains, levers or any other known means of converting rotational input from a motor to useful movement of working implements. The drive train is mechanically connected to the shuttle and to the sheet transfer device to impart controlled motion thereto.

According to a first exemplary embodiment, the motor comprises an output shaft and the drive train comprises a first pulley fixed to the output shaft and a crank. The crank is pivotally mounted by a first pivot and has a first portion arranged to swing about the first pivot. A second pulley is fixed to the crank. A belt or chain is wrapped around the first and second pulleys. The first portion is operatively connected to the shuttle. The crank also includes a second portion arranged to swing about the first pivot. The second portion is operatively connected to the suction device.

The second portion carries a second pivot and the suction device is rotationally mounted to the second portion by the second pivot. A drive arrangement is connected between the second portion and the suction device to swing the suction device about the second pivot simultaneously with pivoting of the second portion about the first pivot.

According to the first embodiment, the drive arrangement comprises a third pulley fixed to the machine frame and a fourth pulley fixed to the suction device to rotate with the suction device about the second pivot, and a belt wrapped around the third and fourth pulleys, rotation of the second portion about the first pivot circulating the belt and rotating the suction device about the second pivot.

According to the first embodiment, a third pivot is carried by the first portion and the shuttle carries a fourth pivot. A linkage is pivotally connected to the third pivot and to the fourth pivot. Pivoting motion of the first portion translates the shuttle linearly via the linkage.

The first embodiment provides a single servomotor drive for the paper interleaver system, independent of the mold plate drive. The suction device motion and the shuttle motion are mechanically linked with a simple linkage. No controlled timing relationships or adjustment are required for proper positioning.

A second exemplary embodiment uses two precise position controlled motors to drive the paper system. Two separate precise position controlled motors, such as servomotors, are used, with one motor driving the suction device movements and the other motor driving the shuttle movements. A precise and flexible control and coordination of the movements between the vacuum cups and the shuttle is made possible.

The servomotor or servomotors of either embodiment apparatus can control the motion of the paper system for the best paper pick-off and placement timing, regardless of the motion of the mold plate. Other sheet interleave systems are mechanically driven by the mold plate drive system and independent motion control is not possible. If the sheet interleave system is not used for certain products, the sheet interleave system is simply turned off, whereas other systems must continue to drive the sheet interleave system, as they are mechanically linked.

According to another aspect of the invention, the sheet interleave system comprises laterally arranged longitudinally extending rods, the rods having protruding ends arranged to be attached to an adjacent patty-forming apparatus and to support the sheet interleave system in cantilever fashion. The rods are also arranged to guide linear movement of the carriage.

The entire sheet interleave system is easily added or removed from the patty-forming apparatus.

The invention provides a substantially modular configuration to a sheet interleaving apparatus that is used with an article-processing apparatus, such as a patty-forming apparatus. The sheet interleaving apparatus is independently driven from the article-processing apparatus. Because the sheet interleaving apparatus is independently driven, the sheet interleaving apparatus can be added to the article processing apparatus, in the field, without undue modifications and retrofitting. Furthermore, because the sheet interleaving apparatus is independently driven, if the sheet interleaving apparatus must be shut down for maintenance, the associated article processing apparatus can still be operated.

The sheet interleaving apparatus of the present invention is driven by a flexible servomotor drive wherein the timing, speeds and movement of the sheet interleaving apparatus can be controlled in precise fashion and need not be limited to a reciprocation that is dependent on the reciprocation timing of the article processing apparatus. Therefore, the steps required for loading a sheet beneath an article can be optimized in timing and step durations to ensure a reliable operation of the sheet interleaving apparatus. Furthermore, because the sheet interleaving apparatus is modular, independently driven, and substantially external to the mechanical components that drive the article processing apparatus, maintenance is simplified and reduced. For example, two dynamic seal points previously required to seal penetrations of drive rods for the heretofore known sheet interleaving apparatus; the drive rods driven by components internal to the article processing apparatus, are eliminated. Some lubrication points for the more complex mechanical drive assembly of the heretofore known paper interleaving apparatus are eliminated.

The sheet interleaving apparatus of either embodiment of the invention is reliable in operation and adaptable to use with a variety of sheets, patty shapes and processes.

Numerous other advantages and features of the present invention will be become readily apparent from the following detailed description of the invention and the embodiments thereof, and from the accompanying drawings.

DESCRIPTION OF THE PREFERRED EMBODIMENT

Figure 1:
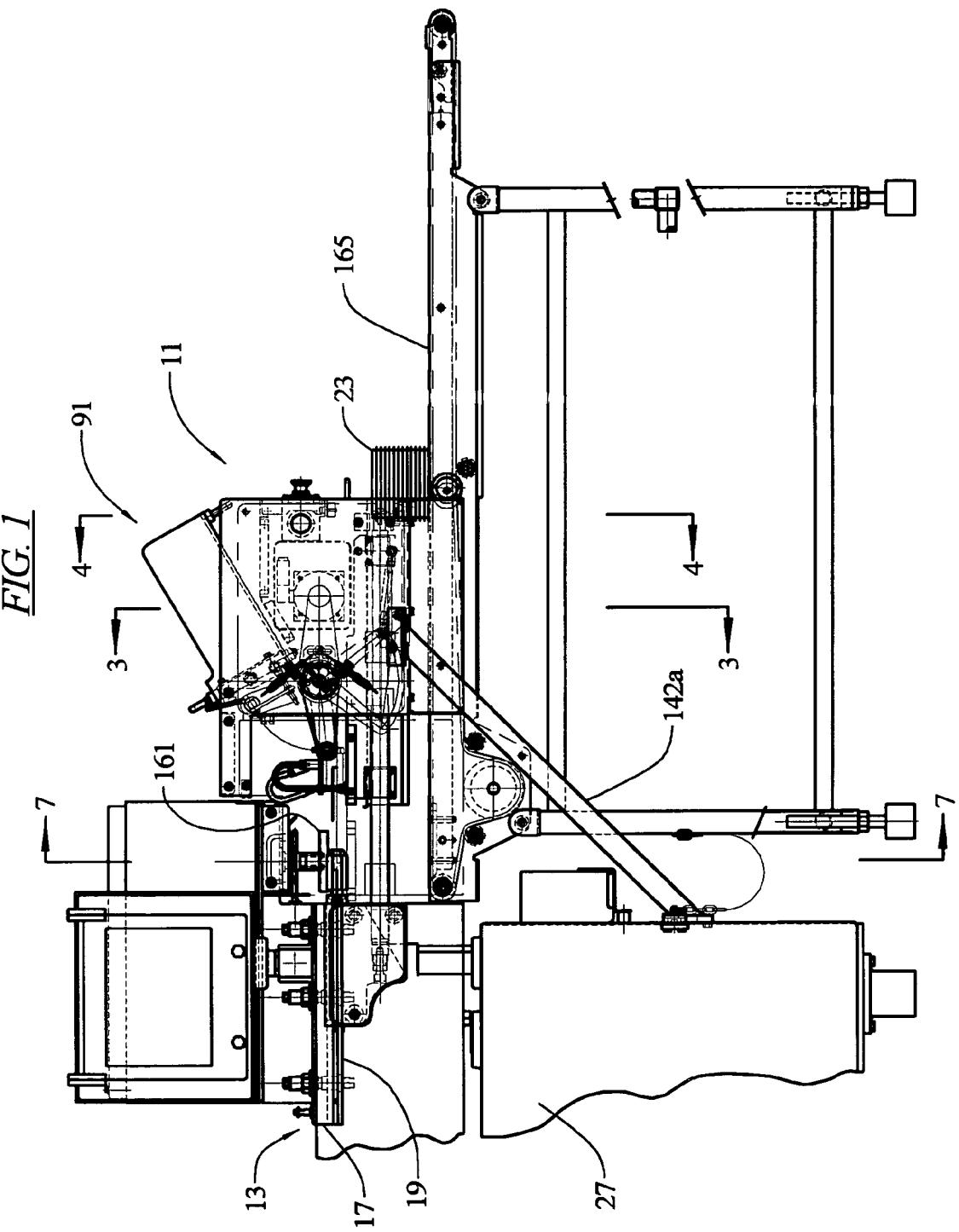
FIG. 1 is a diagrammatic side view of a sheet interleaving apparatus connected to a patty forming apparatus, showing the sheet interleaving apparatus of the present invention, with some components and/or panels removed for clarity.
Figure 2:
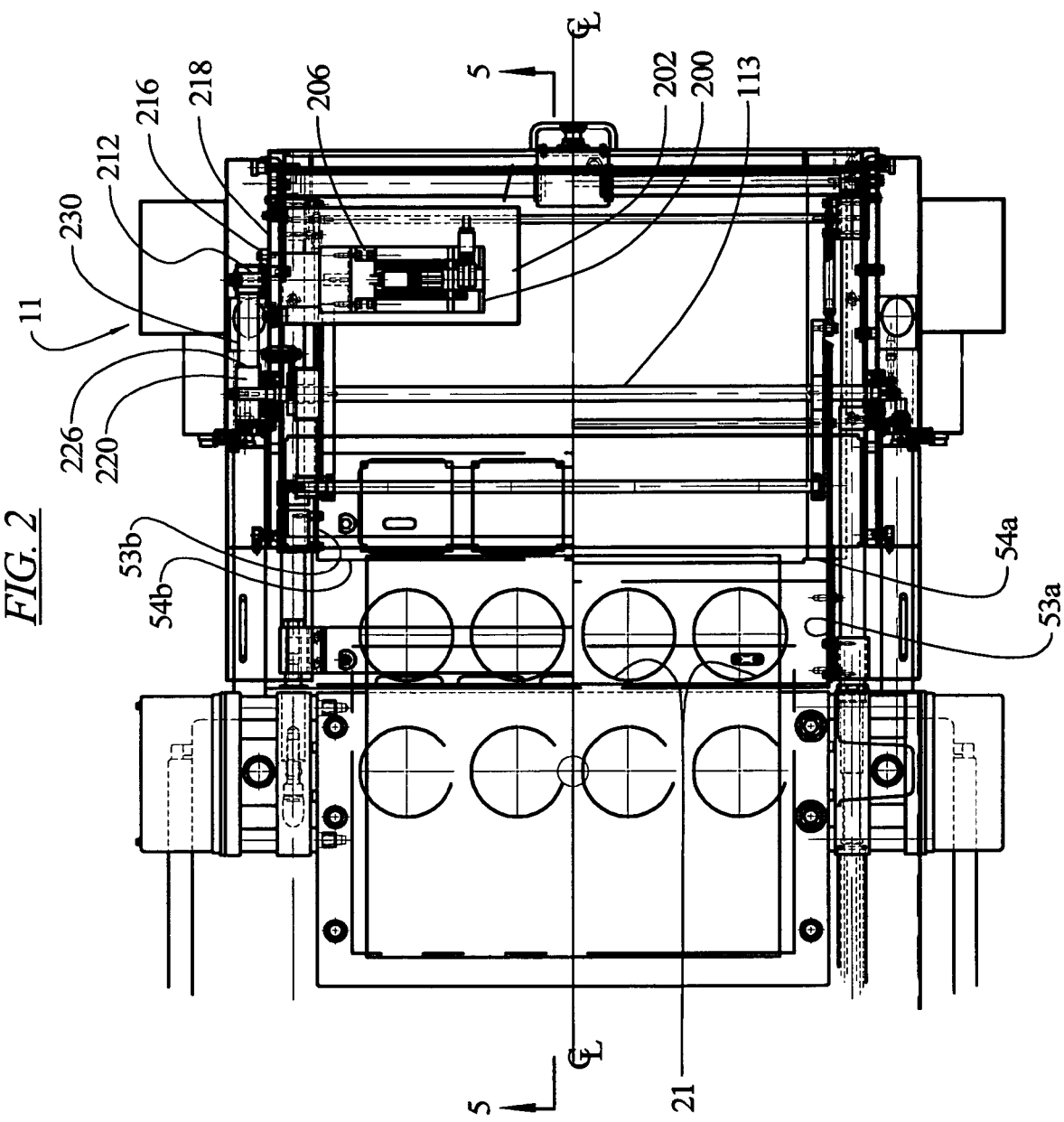
FIG. 2 is a top plan view of the sheet interleaving apparatus of FIG. 1, with some components and/or panels removed for clarity.
Figure 3:
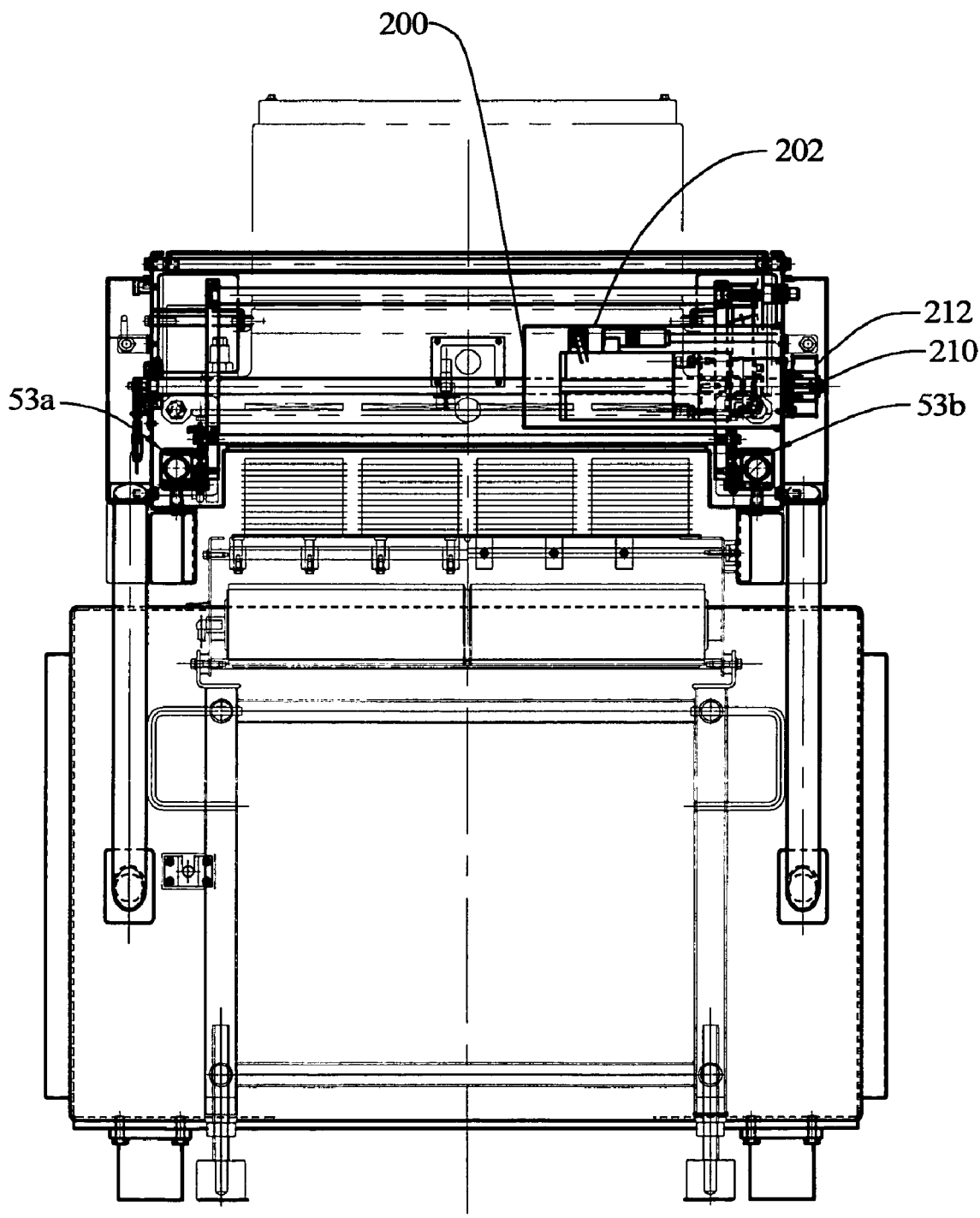
FIG. 3 is a diagrammatic sectional view taken generally along line 3—3 of FIG. 1, with some components and/or panels removed for clarity.
Figure 4:
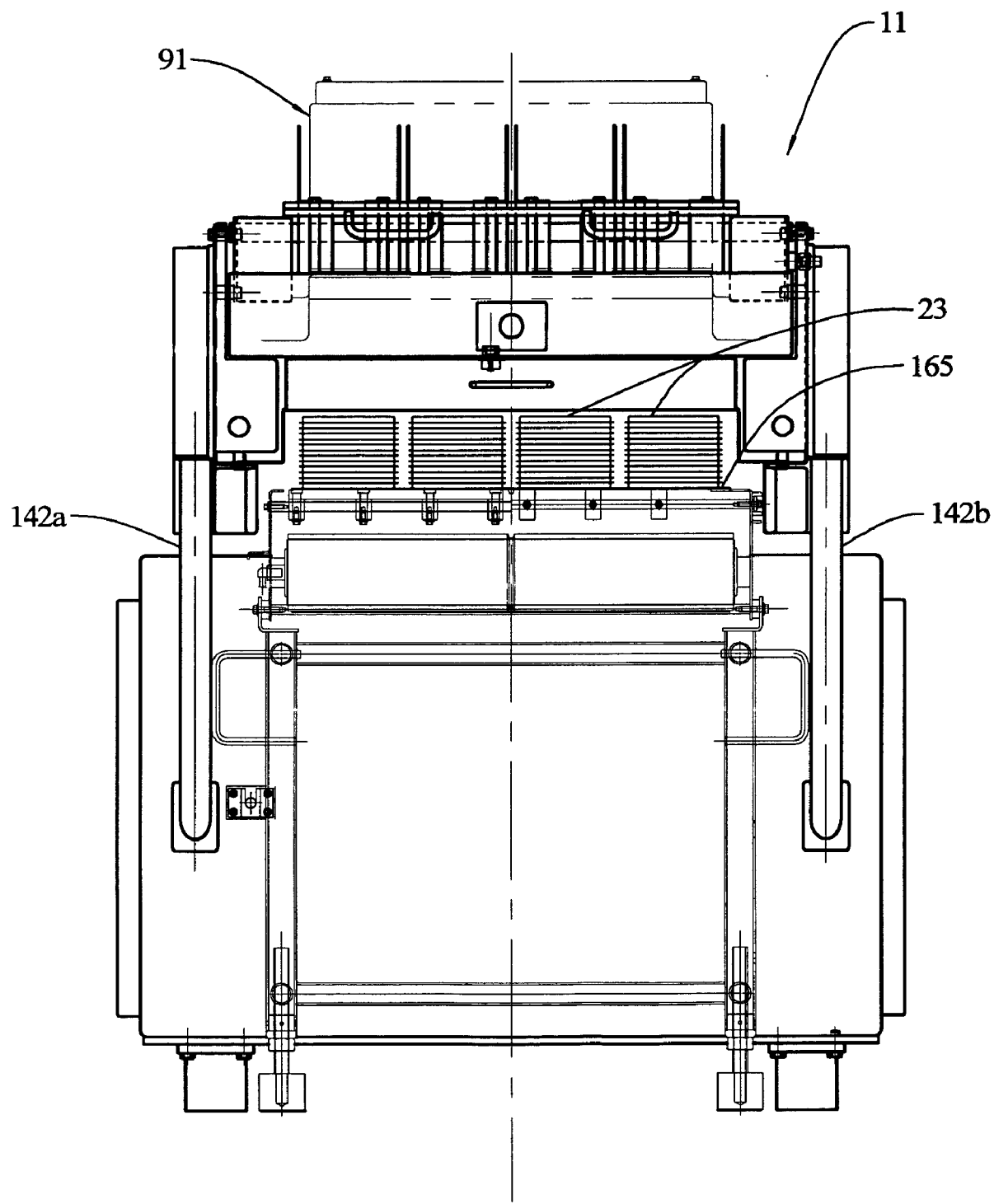
FIG. 4 is a diagrammatic sectional view taken generally along line 4—4 of FIG. 1, with some components and/or panels removed for clarity.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

This application incorporates by reference U.S. Provision Application Ser. No. 60/540,022 filed Jan. 27, 2004 and U.S. Provision Application Ser. No. 60/604,440 filed Aug. 25, 2004.

FIGS. 1 through 9 illustrate a sheet applicator 11 constructed in accordance with the teachings of this invention and connected to the output side of a food patty-molding machine 13.

The food patty-molding machine 13 may be any of the types conventionally used to mold and shape food patties. An example of one of these machines is a molding machine manufactured and sold by Formax, Inc. of Mokena, Ill., known as a FORMAX F-26 patty forming machine, or a FORMAX MAXUM700 machine, or the patty-forming machines shown and described in U.S. Pat. No. 3,952,478, U.S. provisional application 60/515,585, filed on Oct. 29, 2003, and U.S. Ser. No. 10/942,627, filed on Sep. 16, 2004, all herein incorporated by reference.

The food patty-molding machine includes a multiple cavity mold plate 15 which reciprocates between a mold cover 17 and a top plate 19. The mold plate may be formed with a number of patty cavities 21. The machine shown in this example has four cavities which are circular in shape to form relatively thick, flat articles 23 such as hamburger patties, or the like. The cavity shape can also be square, unsymmetrical, irregular or any other desired shape. The food to be molded enters the cavities 21 through input passages (not shown) located in the top plate 19.

The mold plate 15 is moved in a reciprocal path by mold plate drive bars (not shown), located on opposite sides of the machine. The bars are driven in a reciprocal motion by a mechanism which is not shown, but would be housed within a lower base 27 of the apparatus 13.

Figure 6:
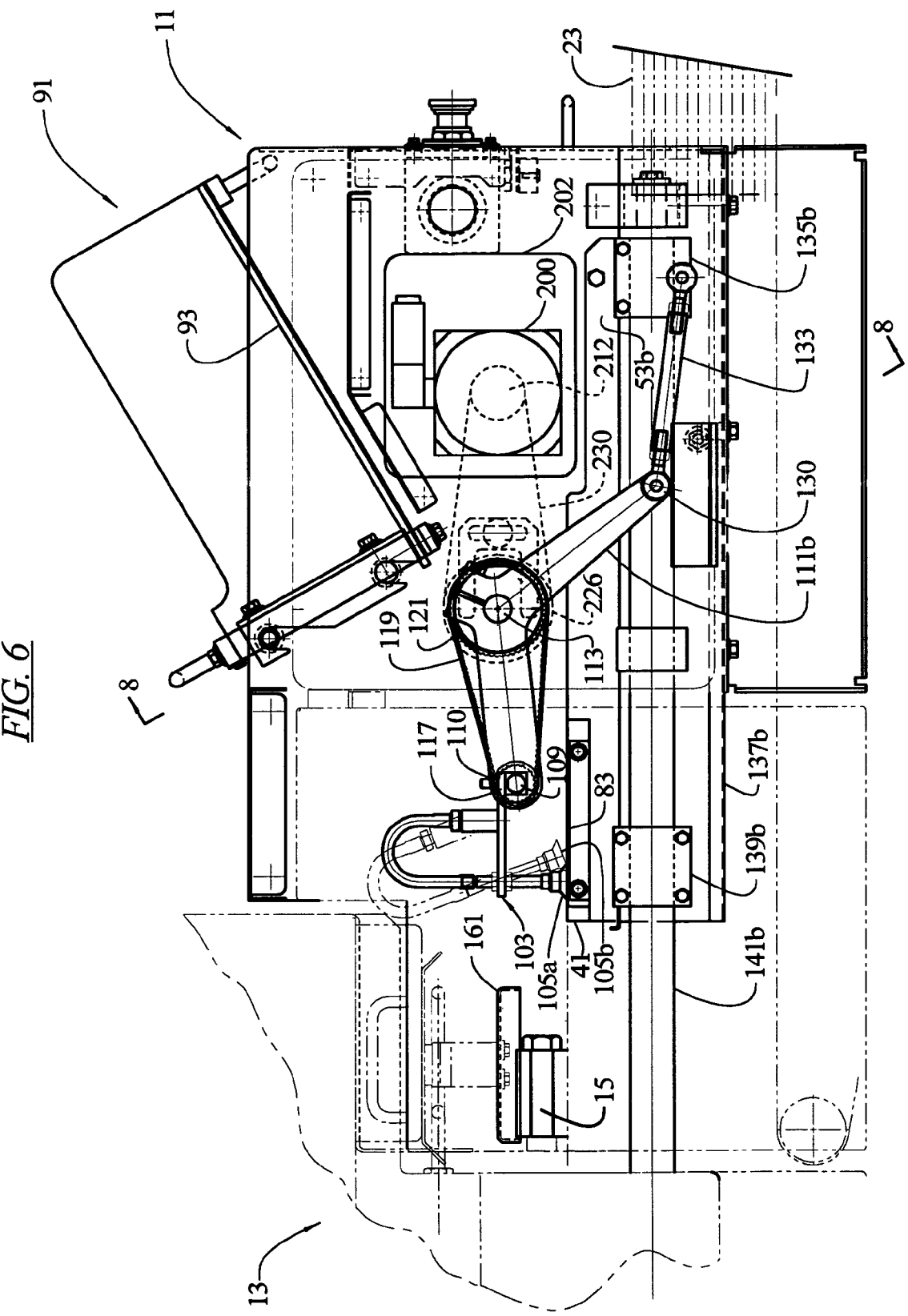
FIG. 6 is a similar view of the apparatus shown in FIG. 5, showing further movement of sheet interleaving components.
Figure 6A:
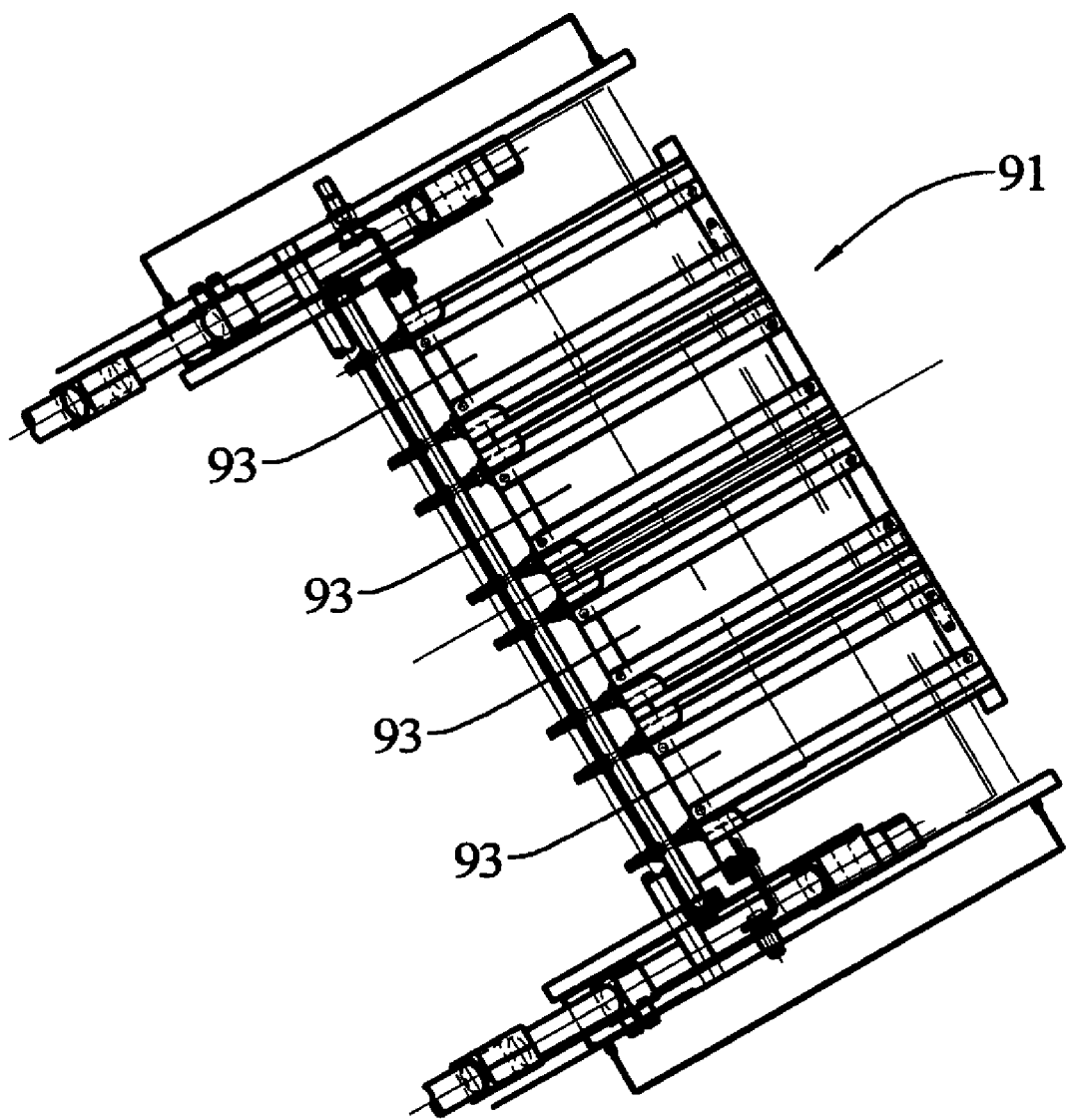
FIG. 6A is a plan view of a sheet dispensing components of the apparatus shown in FIG. 6, with some components and/or panels removed for clarity.
Figure 7:
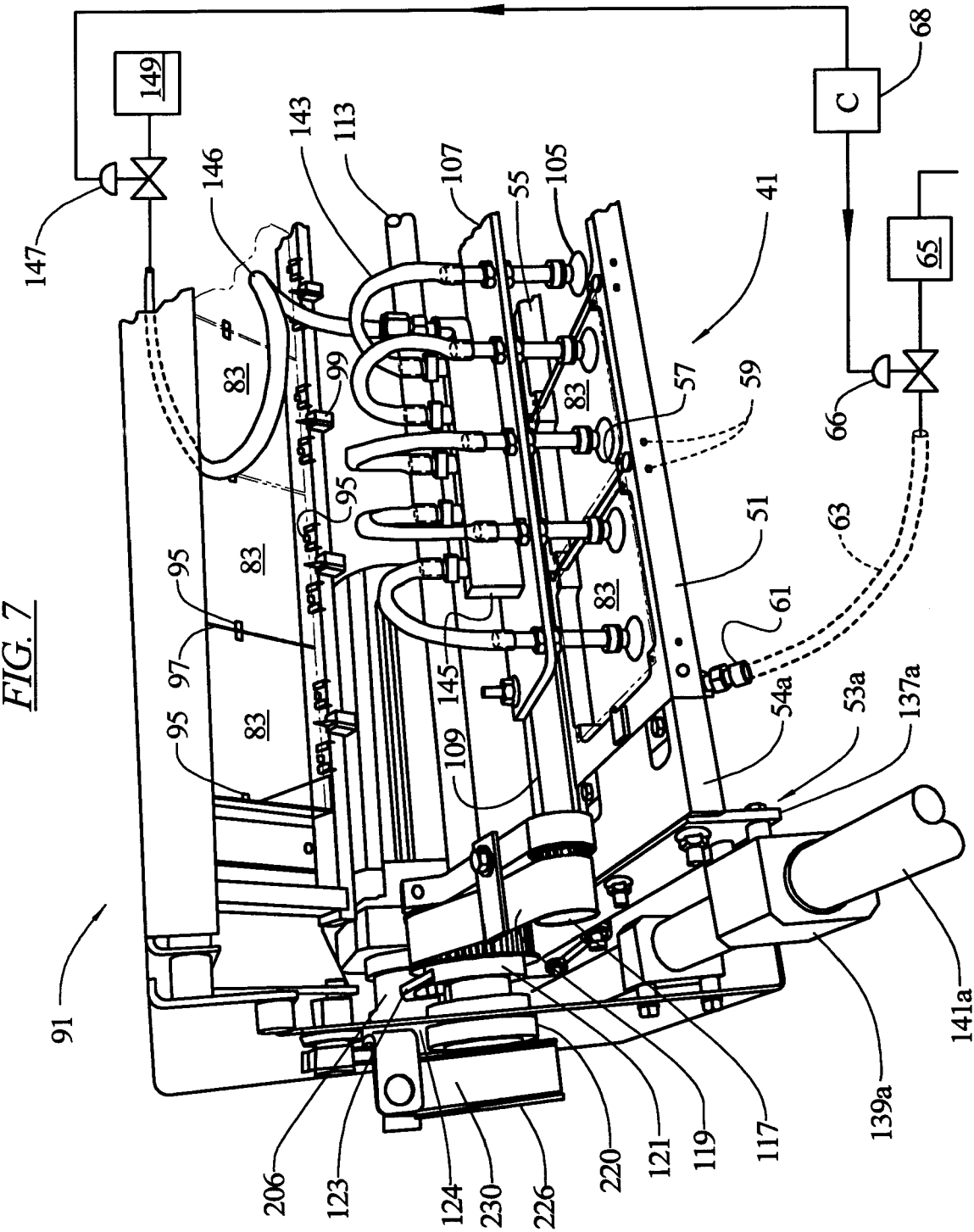
FIG. 7 is a rear, fragmentary perspective view of the apparatus taken substantially from view 7—7 shown in FIG. 1, with some components and/or panels removed for clarity.
Figure 8:
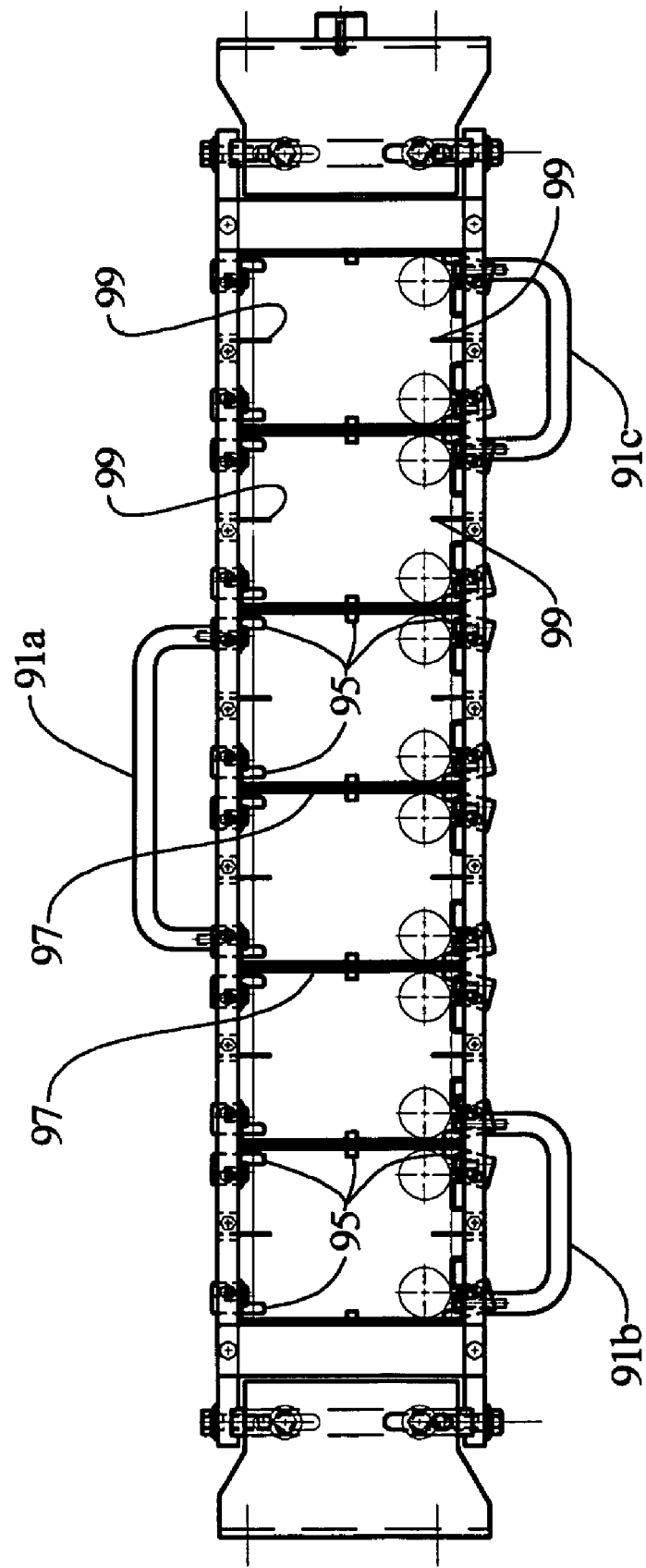
FIG. 8 is a fragmentary, sectional view taken generally along line 8—8 of FIG. 6, with some components and/or panels removed for clarity.
Figure 9:
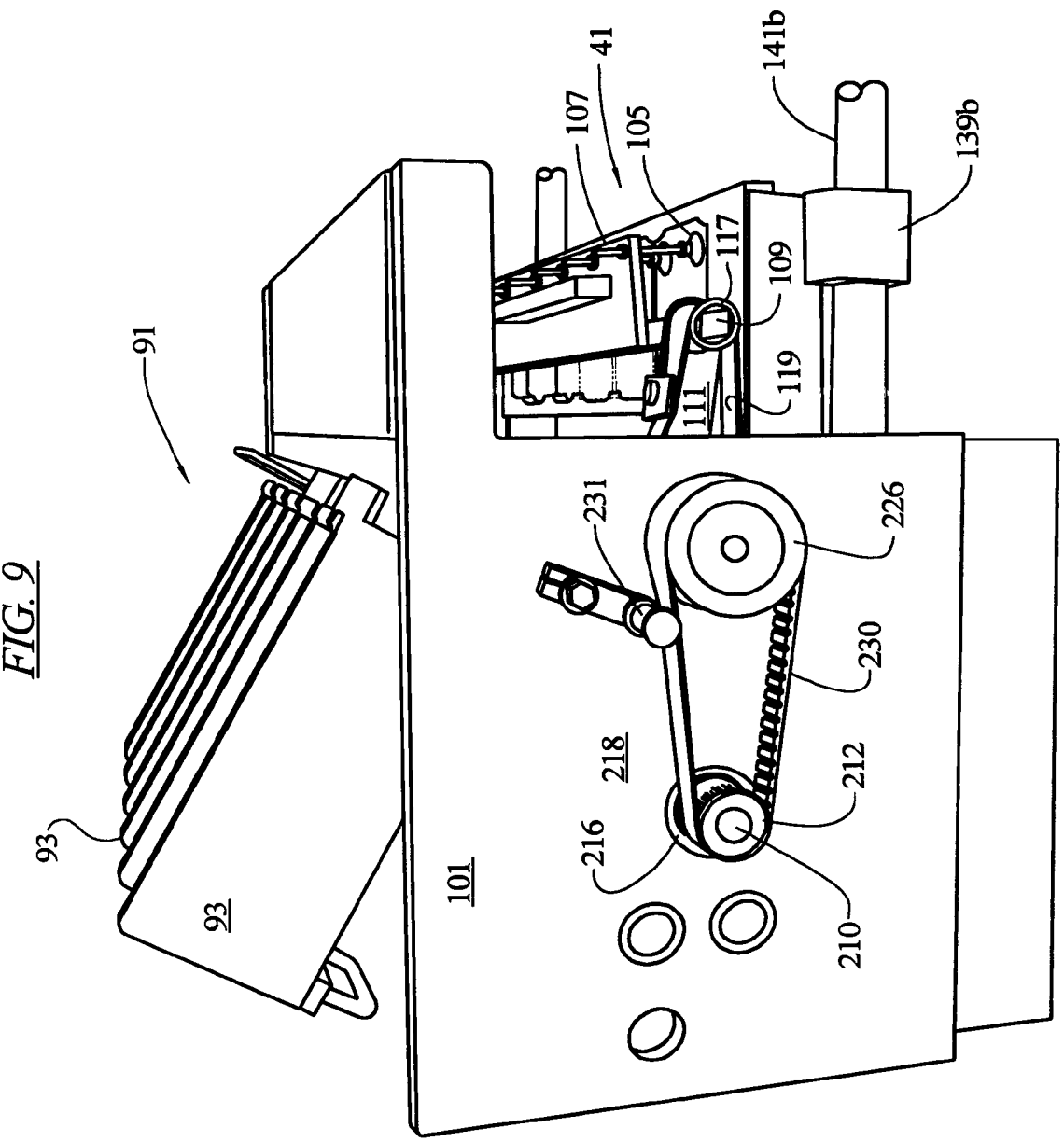
FIG. 9 is a side perspective view of the sheet interleaving apparatus shown in FIG. 7, with some components and/or panels removed for clarity.

The sheet applicator 11 includes a vacuum transfer shuttle 41. The vacuum transfer shuttle 41 includes a sheet-receiving vacuum bar 51 which extends between, and is fastened to, shuttle carriages 53a, 53b via mounting plates 54a, 54b. The shuttle vacuum bar 51 defines openings 55 in the shuttle 41. Suction grippers 57 are located on the upper surfaces of the vacuum bar 51 and more or less surround the periphery of each opening 55. The suction grippers 57 are formed by outlets connected to vacuum channels 59 extending within the vacuum bar 51, such as shown in FIG. 6 of U.S. Pat. No. 3,952,478. The vacuum channels 59 are connected at inlets 61 to vacuum supply lines 63.

The vacuum bar 51 is connected to a vacuum pump 65, preferably, a non-rotating, compressed air driven type, induced vacuum "pump" or vortex vacuum system. Vacuum lines 63 leading from opposite ends of the vacuum bar 51 connect to a solenoid operated valve 66 that controls the input line to the vacuum pump 65. The solenoid operated valve is controlled by the machine control 68 with positional input from the servomotor 200 as described below.

The vacuum grippers 57 are grouped in sets of four to form rectangular configurations spaced along the length of the vacuum bar 51. Each rectangular configuration of vacuum grippers surrounds one opening 55 of the vacuum shuttle. The location of the vacuum grippers 57 thereon are such that the vacuum grippers and projections will support the corners of thin, flexible sheets 83 placed on the vacuum shuttle 41 while allowing passage of thick, flat articles 23 produced by the food patty-molding machine 13 through the openings 55.

A sheet feeder 91 is equipped with a number of inclined hoppers 93, one for each patty cavity 21 in the mold plate 15. The sheet feeder 91 of the type described herein is available from Formax, Inc., as part of a FORMAX F-26 patty-forming machine with a sheet interleaving apparatus.

In this embodiment, there are four hoppers 93, corresponding to the four food patty cavities 21. A stack of thin, flexible sheets 83 are stored in each hopper with the sheets substantially standing on edge at an angle to vertical and held in the hopper by stops 95 located at each corner and on the sides of an open face 97 at the lower end of each inclined hopper. Blades 99 at the top and bottom of this open face 97 engage the top and bottom center of the end sheet 83. The feeder 91 includes handles 91a, 91b, 91c.

A sheet transfer mechanism is arranged for placing thin, flexible sheets 83 from the hoppers 93 onto the vacuum transfer shuttle 41 in alignment with the rectangular groupings of the vacuum grippers 57, to cover the openings 55.

A number, in this case four, of releasable sheet holders or suction devices 103 each remove a single sheet 83 each cycle from a hopper 93 and deposit the sheets on the vacuum transfer shuttle 41. The sheet holders 103 each include a pair of suction or vacuum cups 105. The vacuum cups are formed of a soft flexible material, such as soft rubber. Each cup is mounted on the end of a common suction plate 107. The suction plate is clamped at opposite ends to a cross shaft 109. The suction cups 105 are spaced in pairs along the plate 107 so that two suction cups will engage each sheet 83 at the open face 97 of each hopper 93, with the suction cups contacting the bottom portion of the sheet 83, wherein each cup is located above the lower stops 95 and outwardly of the knives 99.

The opposite ends of the cross shaft 109 are journaled in first free ends 110 of cranks 111a, 111b which are located on opposite sides of the apparatus 11 and configured in mirror image fashion across a vertical longitudinal center plane of the apparatus 11. The middle portion of each crank 111a, 111b is fixed by being clamped to a shaft 113, which extends across the width of the apparatus 11.

At least one small sprocket or toothed pulley 117 is affixed to the cross shaft 109 near one end thereof. The sprocket or pulley engages a chain or toothed belt 119 which also extends around a larger sprocket or toothed pulley 121. The larger pulley 121 is journaled on the shaft 113 and is affixed to a plate 123. The plate 123 is fixed to a stationary portion 124 of the apparatus frame. The larger pulley 121 does not rotate.

Second free ends 130 of cranks 111a, 111b are each pivotally connected to one end of a link 133a, 133b, respectively on opposite sides of the apparatus and configured in mirror image fashion. The opposite end of each link 133a, 133b is pivotally connected to a respective shuttle carriage 53a, 53b on opposite sides of the apparatus and configured in mirror image fashion. The carriages 53a, 53b comprise a first block 135a, 135b, respectively, which first blocks are fastened to a respective longitudinal plate 137a, 137b. Longitudinal plates 137a, 137b are fastened to second blocks 139a, 139b, respectively. The block pairs 135a, 139a; 135b, 139b of the carriages 53a, 53b are slidable on slide rods 141a, 141b, respectively.

The slide rods 141a, 141b are also used to mount the sheet interleaving apparatus 11, in cantilever fashion, with knee braces 142a, 142b, to the patty-forming apparatus 13.

The suction for vacuum cups 105 is drawn through tubing 143 connected to each cup and to a manifold 145. The manifold 145 is connected by tubing 146 to a solenoid controlled valve 147 which is connected to the input side of vacuum pump 149. The vacuum pump 149 is preferably a non-rotating, compressed air driven type, induced vacuum "pump" or vortex vacuum system. The solenoid controlled valve 147 is controlled by the machine controller 68.

The patty-forming machine provides a row of knock-out cups 161 mounted above the vacuum sheet applicator 11 with each cup aligned with a cavity 21 in the mold plate 15, when the mold plate is in its outwardly extended, knock out position. Upon downward movement, the cups 161 force the food articles 23 out of the cavities 21 of the mold plate. While following these paths, each food articles 23 moves through an opening 55 of the vacuum bar 51, engages a sheet 83, and lands with the sheet on a conveyor 165 or on a previously deposited article 23 on the conveyor, forming a stack 25. At a select time, the conveyor 165 transports the stacked patties with interleaved sheets 83 to a discharge station.

During operation, the individual movements of the suction plate 107, the shuttle 41 and the mold plate 15 are substantially as described in U.S. Pat. No. 3,952,478. However, in that patent, the movements of the suction cups, and the shuttle that transfers the sheets to the knock out station, are mechanically linked to the movement of the mold plate and the knockout cups. In contrast, the present invention provides a controllable drive for shuttle 41 and the suction plate 107 that mounts the suction cups, that is mechanically independent of the drive for the mold plate and knockout cups. Thus, although the suction plate 17, the shuttle 41, the knockout cups 161, and the mold plate 15 have like movements as the like components in U.S. Pat. No. 3,952,478, according to the invention, movements of the sheet interleaving components can be precisely adjusted independent of mold plate movement and knock out cup movement. In this way, as long as the shuttle is in position for the stroke of the knock out cups, the movements of the suction plate 107 and the shuttle 41 can be optimized for conditions most favorable to successfully removing a row of single sheets from the sheet feeder and depositing the row of sheets on the shuttle 41.

According to the invention, a servomotor 200 drives the cranks 111a, 111b which drive the shuttle 41 and the vacuum plate 107. The servomotor is preferably a 3000 rpm, 3.1 KW (about 4 HP) servomotor. The servomotor includes a built in resolver for precise positioning information and control. The servomotor 200 is enclosed in a housing 202 to protect the servomotor from moisture. The servomotor includes a gearbox 206 with a turn ratio of about 5:1. An output shaft 210 of the gearbox 206 is fixed to a toothed pulley 212. The output shaft 210 is journaled for rotation by a bearing 216 mounted on a sidewall 218 of the apparatus 11. The shaft 113 freely penetrates through the toothed pulley 212 and is journaled by a bearing 220 mounted to the sidewall 218. The shaft 113 is fixed to a toothed pulley 226. A toothed belt 230 wraps around the pulleys 212, 226. The pulleys 212,226 have about a 2:1 turn ratio such that the overall turn ratio between the servomotor and the shaft 113 is about 10:1.

Figure 5:
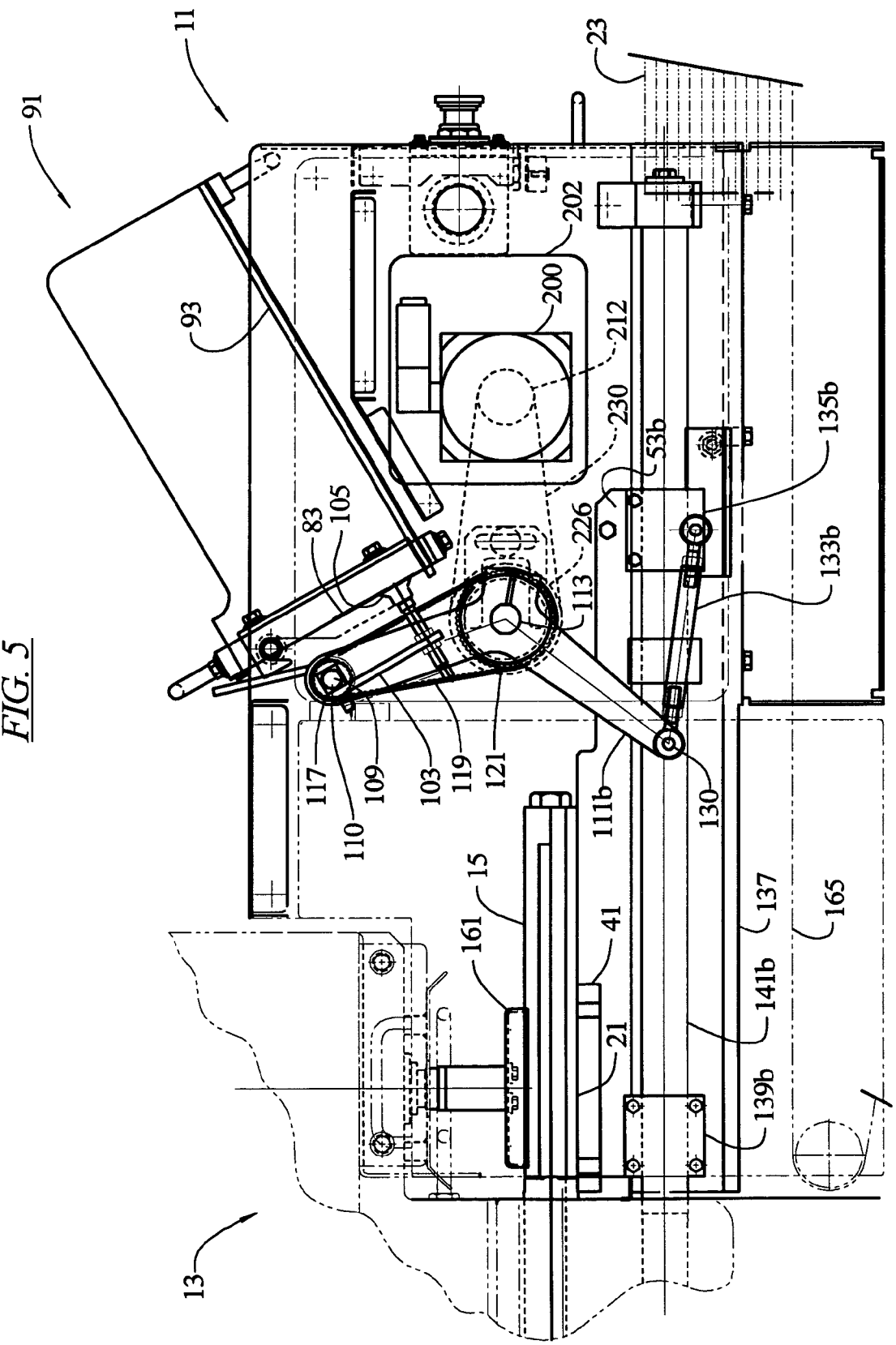
FIG. 5 is sectional view taken generally alone line 5—5 of FIG. 2, with some components and/or panels removed for clarity.

In operation, the servomotor 200 rotates in one direction and then in the opposite direction, causing the shaft 113 to rotate the cranks 111a, 111b to swing the shaft 109 from the position shown in FIG. 6 to the position shown in FIG. 5. As the shaft 109 is swung the small pulley 117 rotates by force from the belt 119, and the suction plate 107 flips the suction cups 105. This displaces the suction cups 105 through the positions indicated as 105a to 105b (FIG. 6) to 105 (FIG. 5). Once the direction of rotation of the servomotor 200 reverses, the shaft 113 rotates to swing the shaft 109 from the position shown in FIG. 5 to the position shown in FIG. 6 and the suction cups 105 move through the positions 105 (FIG. 5) to 105b to 105a (FIG. 6). The position 105a of the suction cups corresponds to the sheets 83 being placed on the shuttle 41. The position 105 (FIG. 5) corresponds to the sheet 83 being engaged by the suction cups while in the feeder 91.

While the shaft 113 pivots to swing the shaft 109 from the position shown in FIG. 6 to the position shown in FIG. 5, the free ends 130 of the cranks 111a, 111b swing to pull the carriages 53a, 53b toward the patty forming apparatus 13 to place the vacuum bar 51 to the position wherein the openings 55 align with the knock out cups, beneath the knock out cups. The knock out cups can then be driven downward to dispense the sheets 83 from the vacuum bar 51. When the direction of rotation of the servomotor reverses, the free ends 130 of the cranks 111a, 111b swing back such that the sheets 83 taken from the feeder hoppers 93 by the suction cups 105 are placed on top of the now empty vacuum bar 51 which now registers with the suction cups at the position 105a (FIG. 6).

The servomotor is signal-connected to the machine control 68 for the patty-forming apparatus or can have its own control that communicates with the machine control 68. The timing and dwell of the servomotor at different stages of its rotation can be adjusted to optimize the process of removing a row of single sheets from the feeder hoppers 93 and depositing those sheets onto the shuttle 41 in reliable fashion.

The machine control, with positional input from the servomotor, controls the timing of the application of vacuum to both the manifold 145 for the suction cups 105, and the vacuum bar 51 for the grippers 57.

Figure 10:
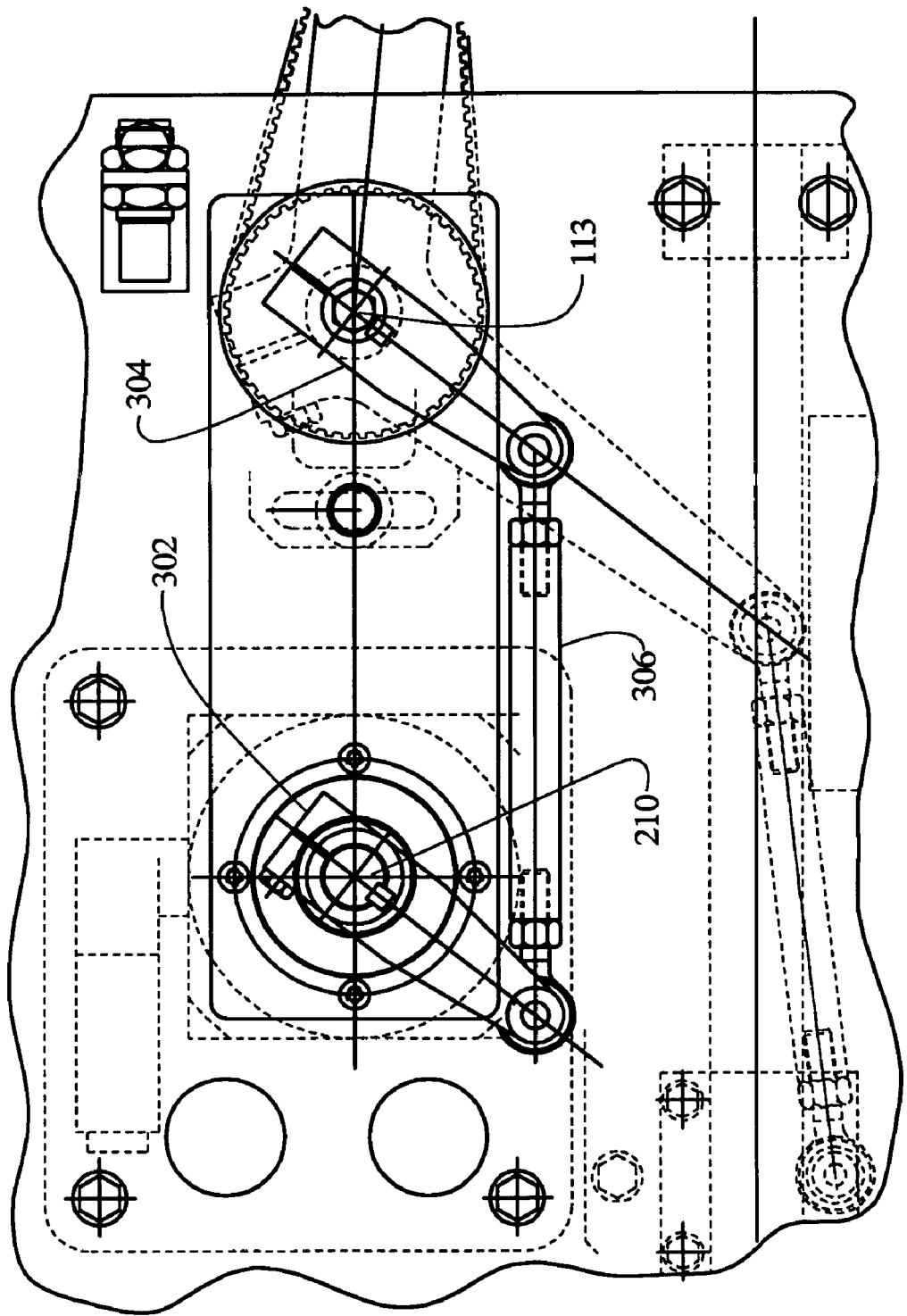
FIG. 10 is a side view of an alternate embodiment feature of the present invention.
Figure 11:
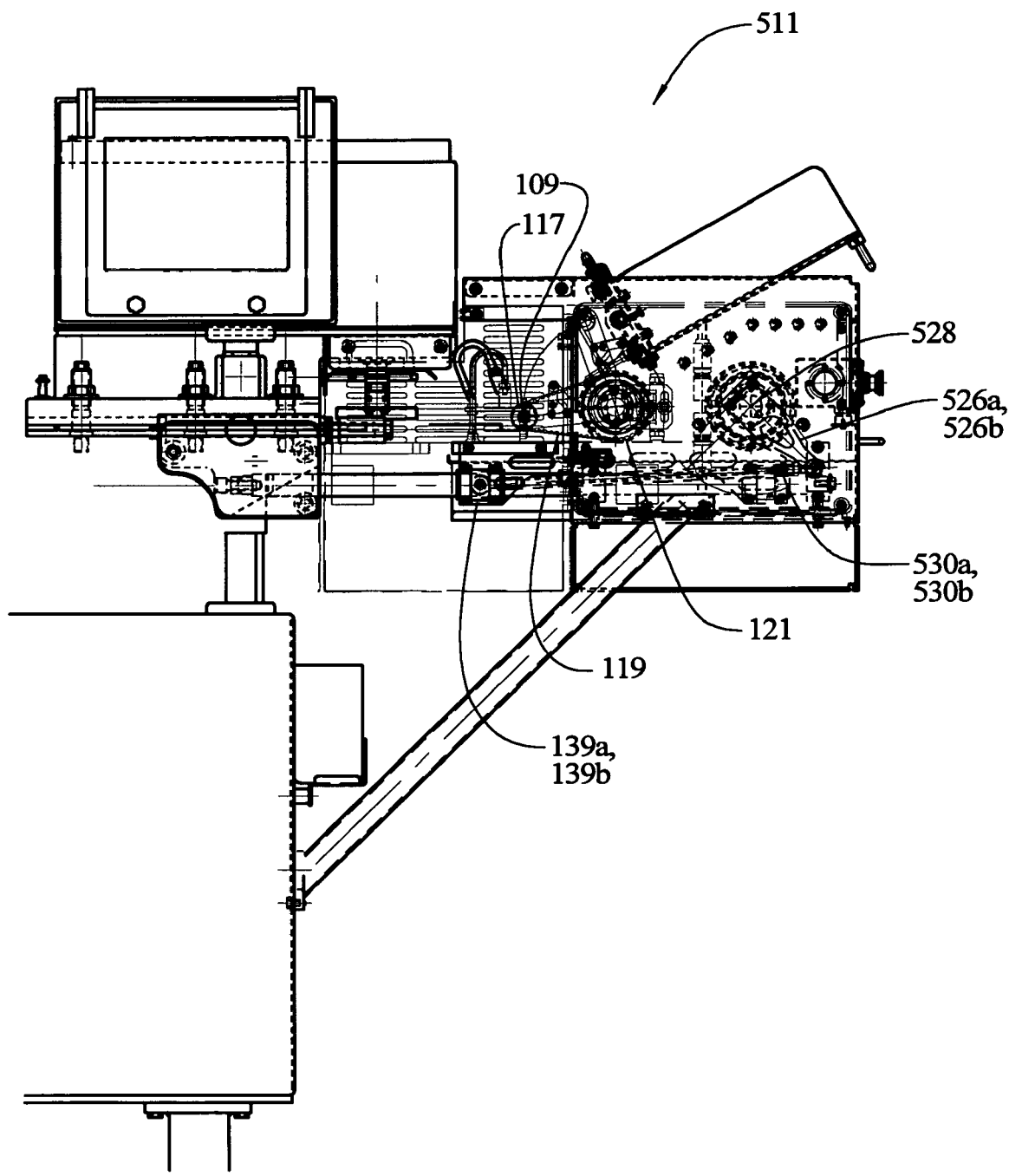
FIG. 11 is a diagrammatic side view of a sheet interleaving apparatus connected to a patty forming apparatus, showing an alternate embodiment sheet interleaving apparatus, with some components and/or panels removed for clarity.
Figure 12:
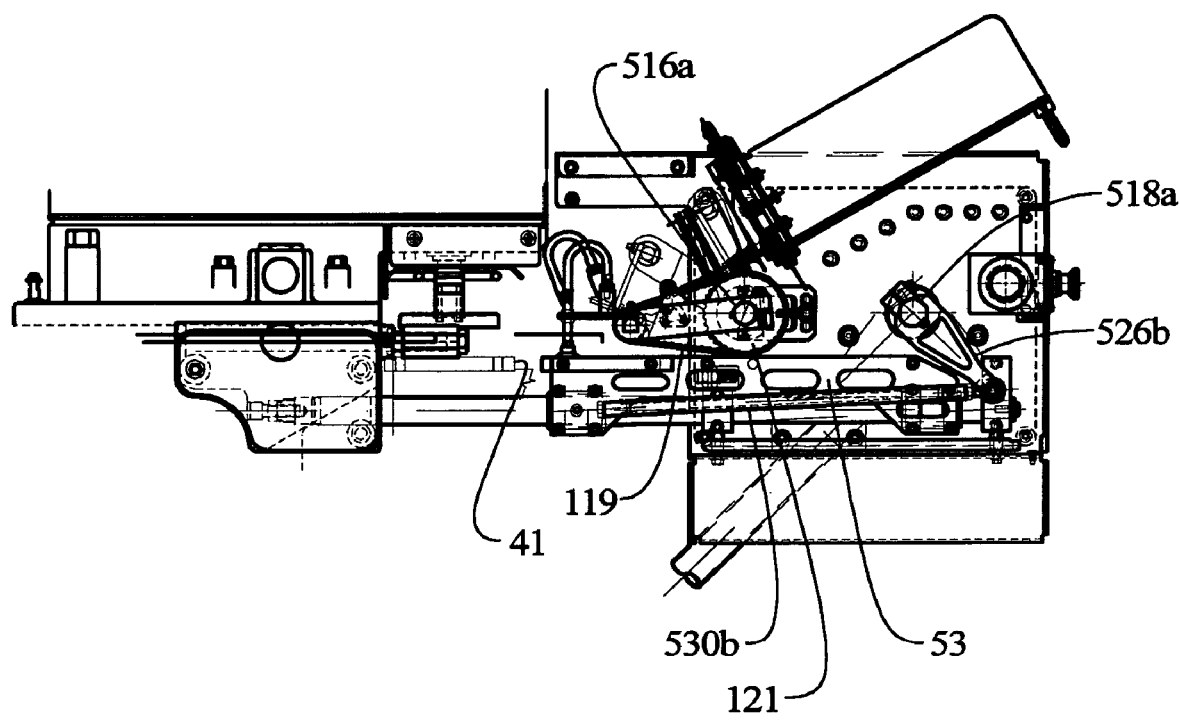
FIG. 12 is a fragmentary, sectional view of the apparatus of FIG. 11, with some components and/or panels removed for clarity.
Figure 13:
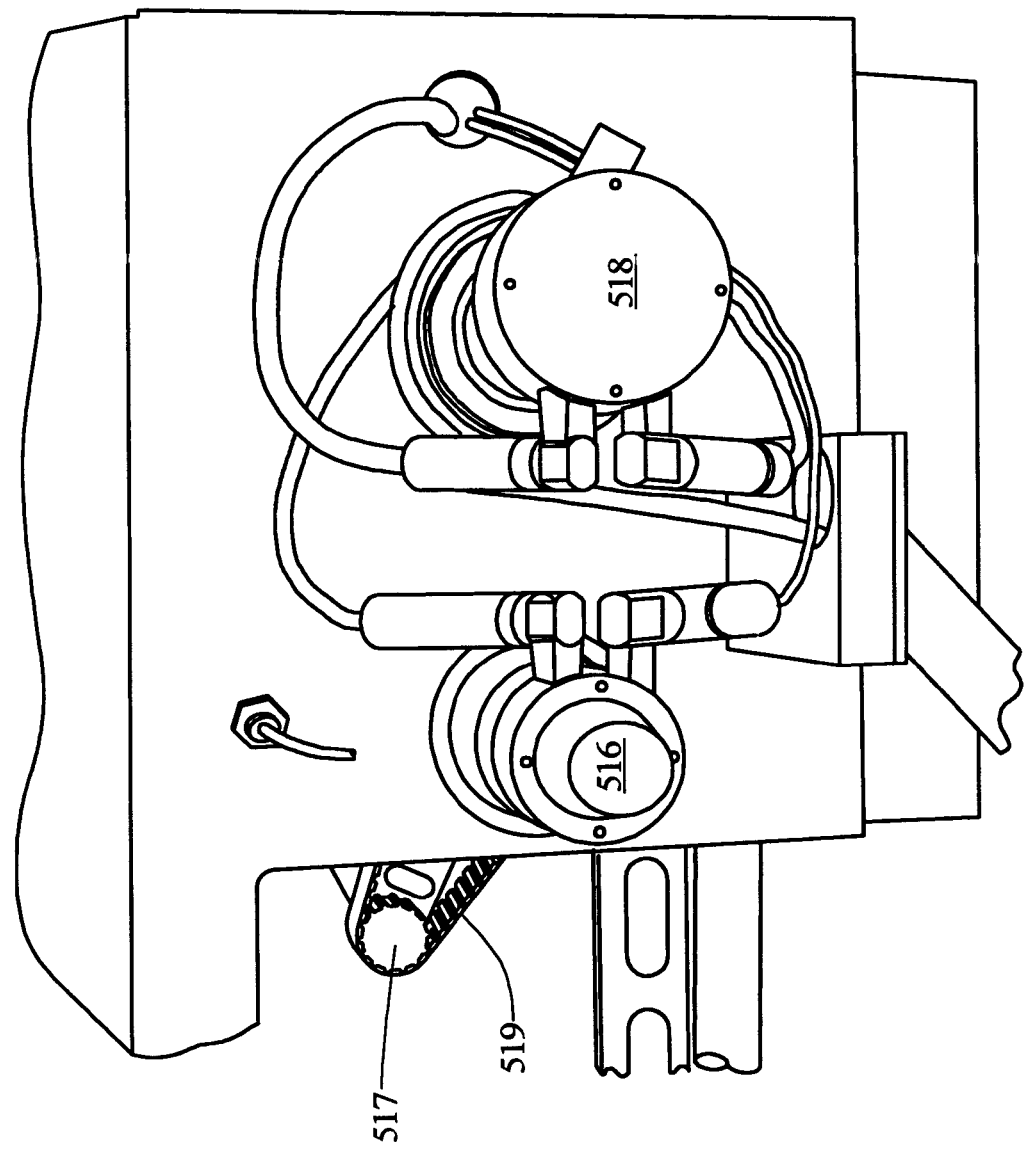
FIG. 13 is an enlarged, fragmentary perspective view of the apparatus of FIG. 11.
Figure 14:
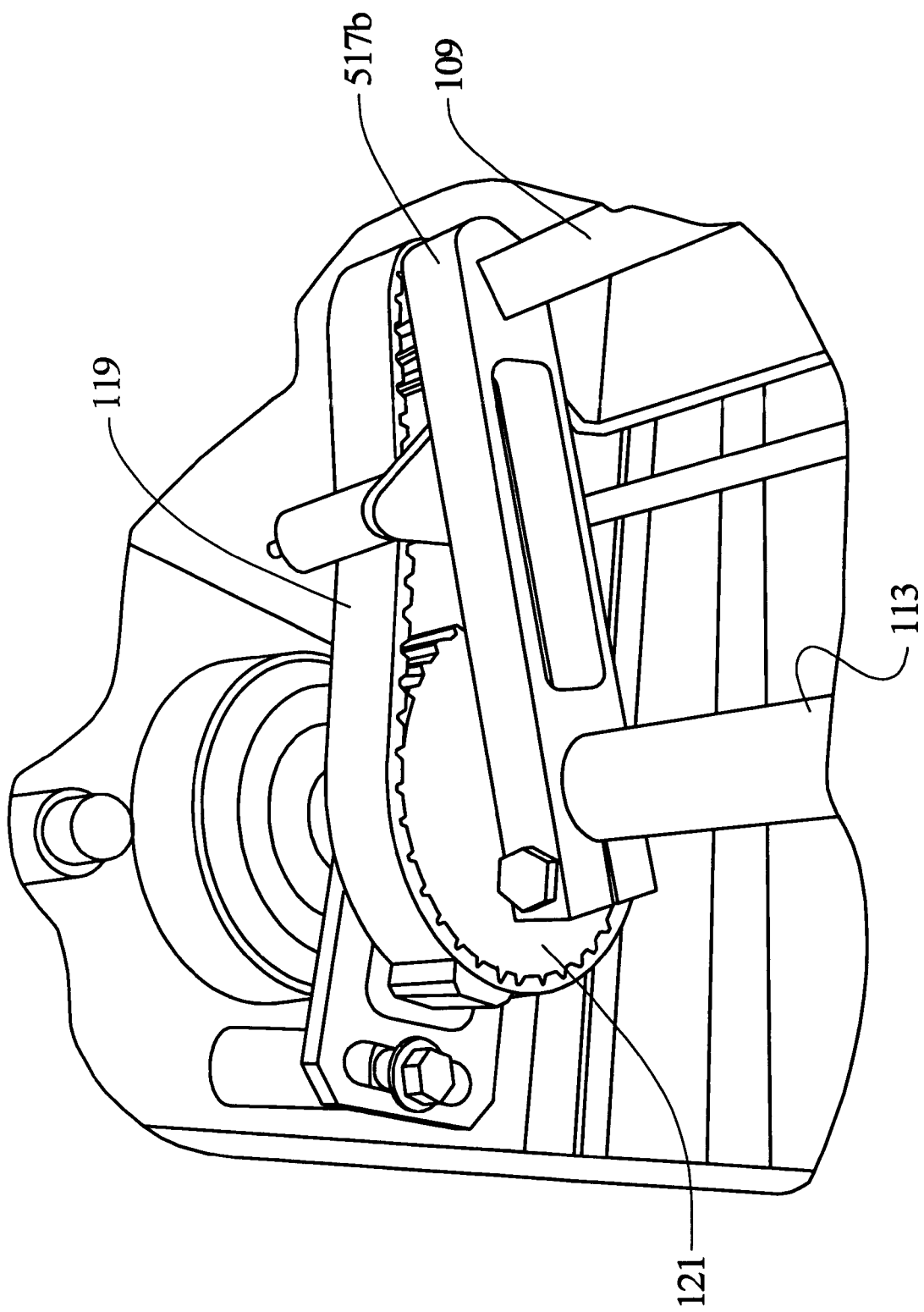
FIG. 14 is an enlarged, fragmentary inside perspective view of the apparatus shown in FIG. 11.
Figure 15:
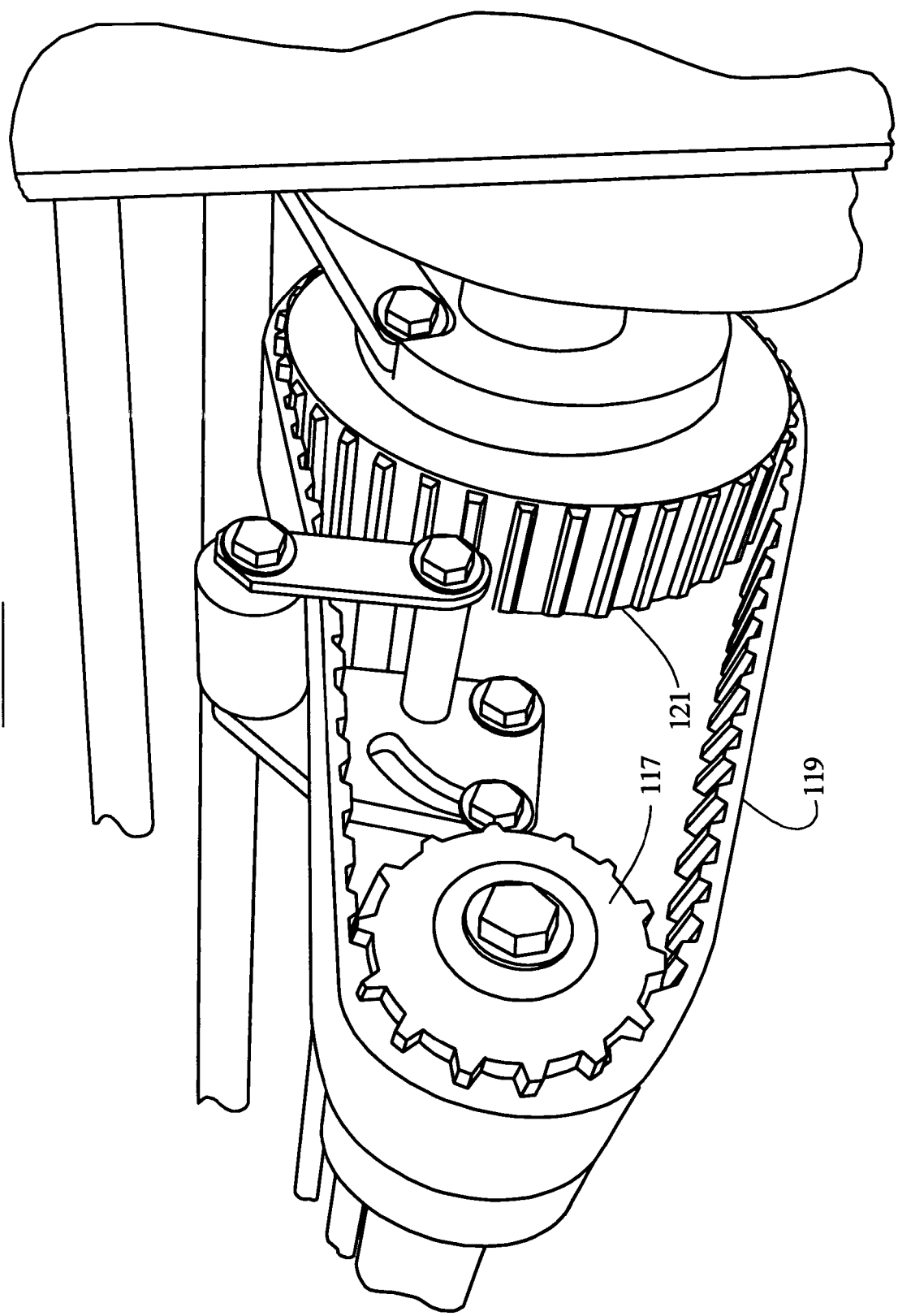
FIG. 15 is a fragmentary reverse perspective view of the apparatus shown in FIG. 14.
Figure 16:
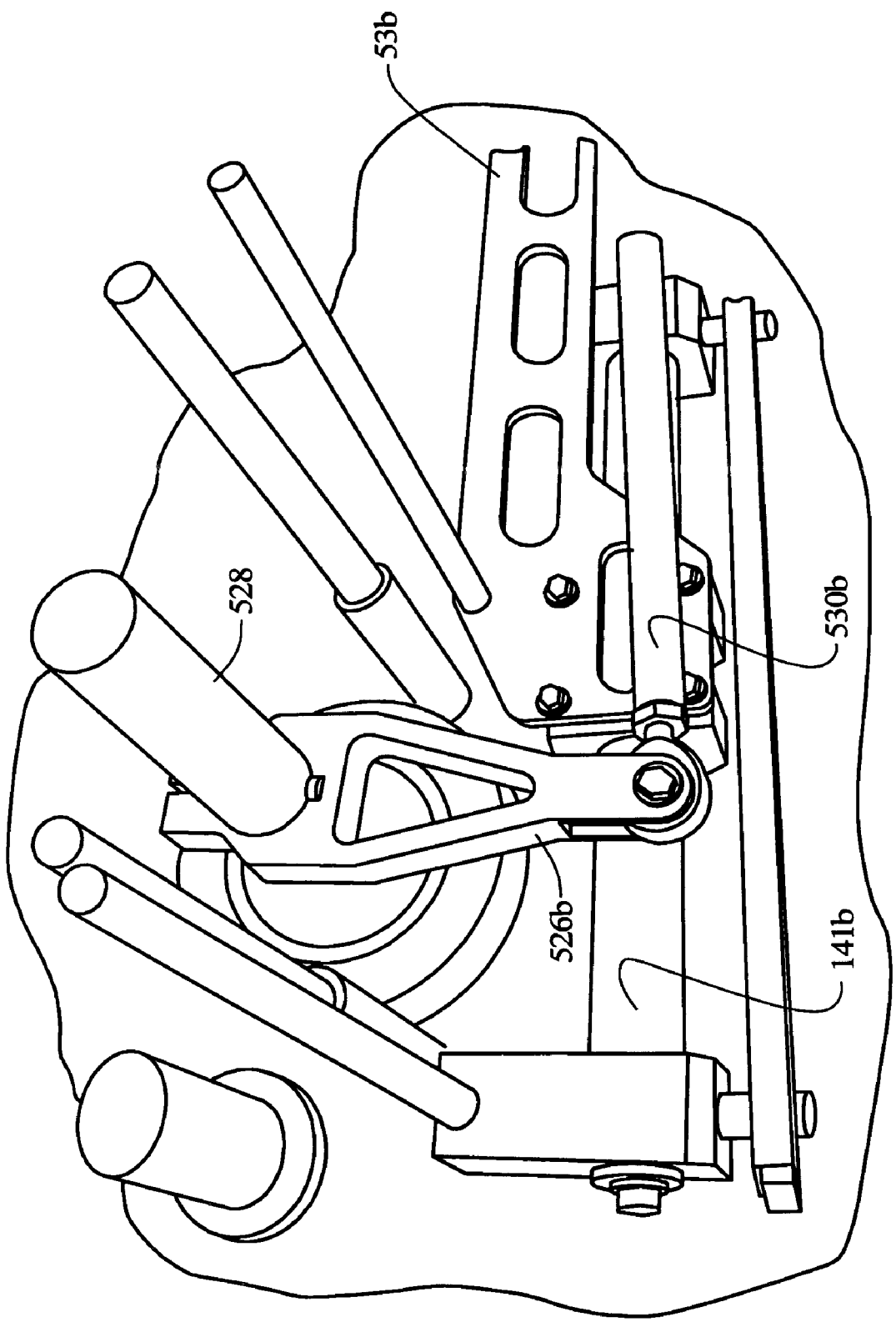
FIG. 16 is an enlarged fragmentary inside front perspective view of the apparatus of FIG. 11.
Figure 17:
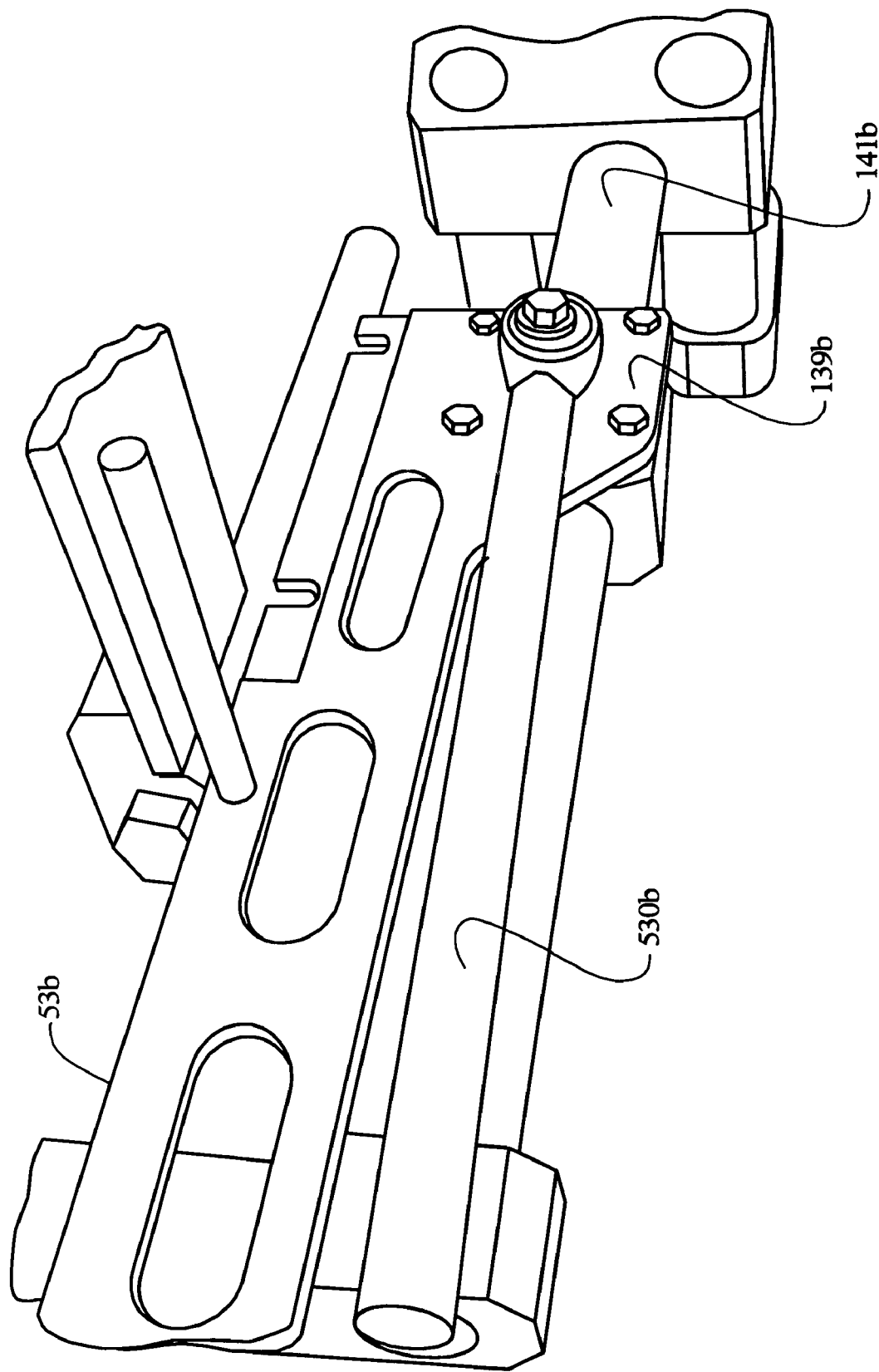
FIG. 17 is an enlarged, fragmentary inside rear perspective view of the apparatus of FIG. 11.

FIG. 10 illustrates alternate components to the pulley 212, pulley 226, belt 230, and tensioner 231. According to this embodiments levers 302, 304 are respectively fixed to the output shaft 210 of the gearbox 206 and the shaft 113. The gearbox can have a turn ratio of 10:1 and the levers 302, 304 pivot back and forth together via a link 306 which is adjustable.

FIGS. 11 through 17 illustrate an alternate embodiment sheet applicator 511. According to this embodiment, a first motor 516 drives the vacuum plate 107. A second motor 518 drives the shuttle 41.

The first motor 516 has an output shaft 516a that drives the shaft 113 that pivots levers 517a, 517b fixed on the shaft 113 that causes the belt 119 to pivot the small sprocket or toothed pulley 117 as described in the prior embodiment. The levers 517a, 517b are arranged the same as the previously described cranks 111a, 111b, except in this embodiment the levers 517a, 517b have no lower portion for reciprocating the shuttle.

The second motor 518 has an output shaft 518a that is coupled to a transverse shaft 528 that is keyed to cranks 526a, 526b. The second motor 518 drives the shaft 528 to swing the cranks 526a, 526b. The cranks 526a, 526b are respectively connected to rods 530a, 530b that extend rearward and are attached respectively to the blocks 139a, 139b. Pivoting of the cranks 526a, 526b by the motor 518 drives the shuttle 41 on the slide rods 141a, 141b. The cranks 526a, 526b and the rods 530a, 530b and carriages 53a, 53b are arranged on opposite sides of the apparatus 511 in mirror image fashion across a longitudinal vertical center plane of the apparatus 511.

Preferably, the first and second motors 516, 518 are precise position controlled motors, such as servomotors. The servomotors 516, 518 are signal-connected to the machine control for the patty-forming apparatus or can have its own control. The timing and dwell of the servomotors at different stages of their rotation can be adjusted to optimize the process of removing a row of single sheets 83 from the feeder hoppers 93 and depositing those sheets onto the shuttle 41 in reliable fashion.

The machine control, with positional input from the servomotors, controls the timing of the application of vacuum to both the manifold 145 for the suction cups 105, and the vacuum bar 51 for the grippers 57.

The alternate embodiment of FIGS. 11–17 is different from the previously described embodiment in that a single precise position controlled motor is replaced by two motors that make the drive for the shuttle and the drive for the suction cups mechanically independent. Accordingly, the two drives can be precisely controlled by the machine controller to optimize their functioning depending on the circumstances such as paper type, machine output speed, etc. In other respects, the other parts of the alternate embodiment of FIGS. 11–17 operate in like fashion as the parts of the previously described embodiment.

Figure 18:
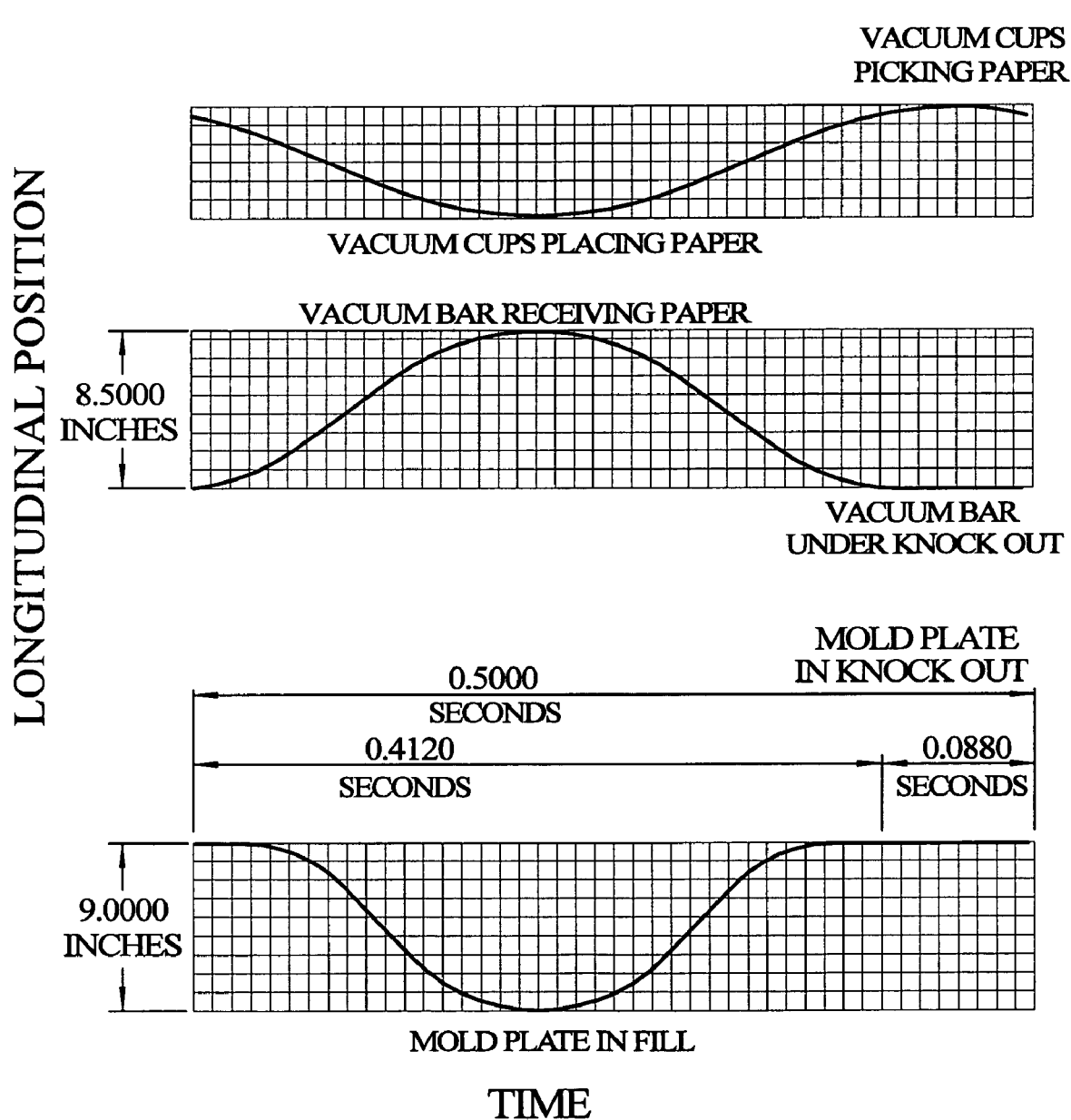
FIG. 18 is a first position vs. time chart for the moving parts of the patty-forming apparatus and the sheet interleave system, the mold plate, the shuttle and the vacuum cups.

FIG. 18 demonstrates one timing arrangement for the patty-forming apparatus and the sheet interleave system of the invention. According to this arrangement, the mold plate reciprocates according to a substantially smooth sinusoidal movement profile with a dwell period arranged at the knock out position in order to accommodate the dispensing of patties from the mold plate by the reciprocating knock out plungers. The shuttle also moves according to a substantially smooth sinusoidal profile with a dwell also corresponding to the knock out position of the mold plate. The mold plate and shuffle move in opposition, toward then away from each other. As illustrated, because the vacuum cups are driven by a separate servo motor than that which drives the shuttle, the vacuum cups need not have a dwell period corresponding to the dwell period of the shuttle.

Figure 19:
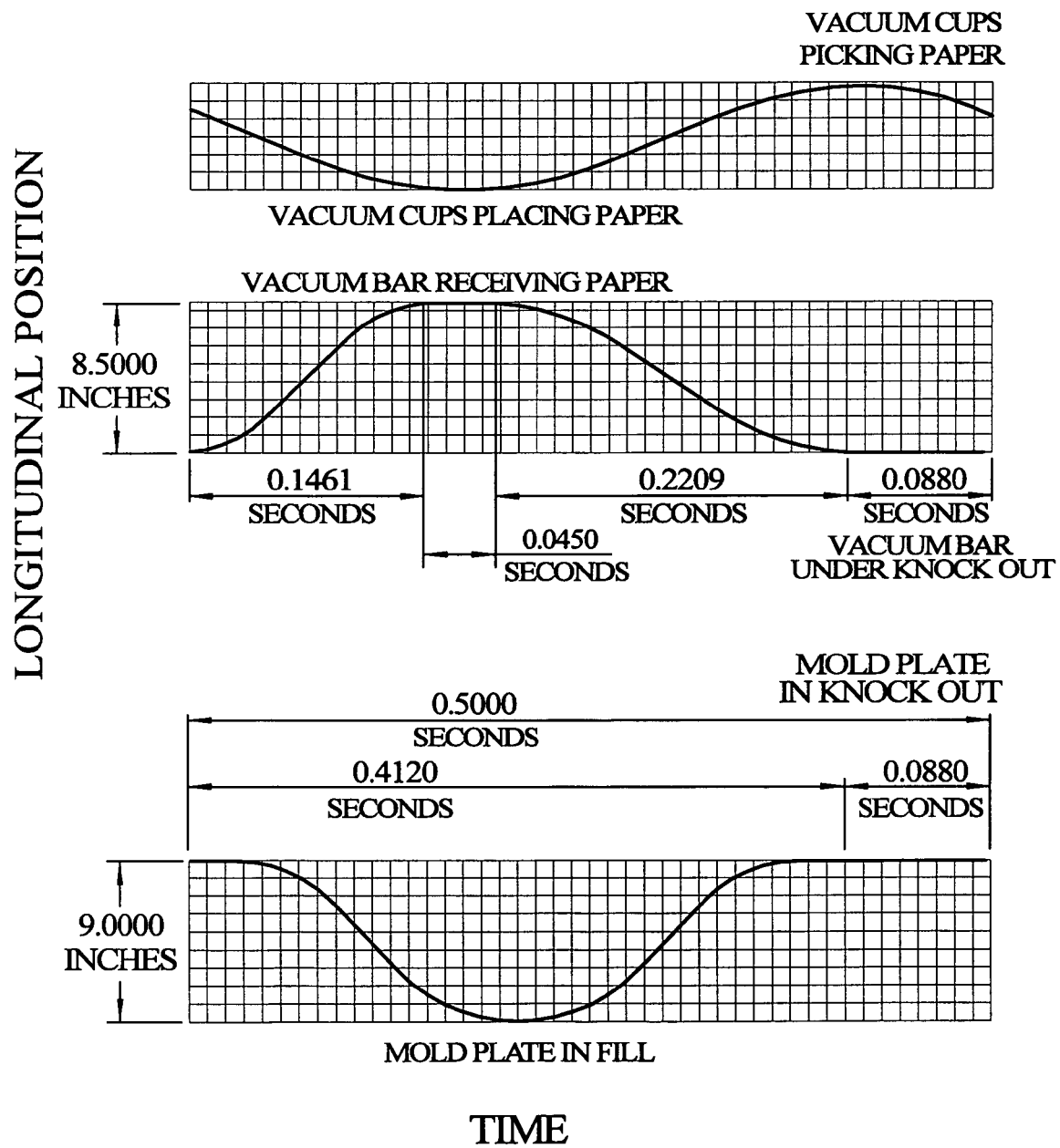
FIG. 19 is a second position vs. time chart for the moving parts of the patty-forming apparatus and the sheet interleave system, the mold plate, the shuttle and the vacuum cups.

FIG. 19 illustrates another motion profile for the three moving components that can be programmed for the servomotor and the mold plate drive. According to this motion profile, the shuttle can have a dwell period for receiving the paper and this dwell period can be offset from the fill or home position of the mold plate. Furthermore the vacuum cup movement can be set to correspond to the shuttle dwell for proper placement of the paper on the vacuum bar, whereas the paper dispensing by the vacuum cups can occur asymmetrically, being at the beginning of the knock out dwell.

FIGS. 18 and 19 demonstrate the flexibility of motion programming for the paper interleave system using two servomotors. Depending on the speed of the operating patty-forming apparatus and the quality of the paper used in the interleaving system, the motion profiles can be adjusted to achieve optimal results.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A sheet interleave system for a patty-forming apparatus having a reciprocating mold plate, comprising:
   a frame;
   a hopper holding sheets;
   a shuttle slidable on said frame from a sheet-receiving position and a sheet-dispensing position and having a sheet-holding frame;
   a sheet transfer device having a suction device for gripping a sheet, said suction device moveable from a position to grip a sheet from the hopper to a position to place the sheet on the sheet-holding frame;
   a first precise position controlled motor; and
   a first drive train driven by said precise position controlled motor, said drive train mechanically connected to said shuttle to impart controlled motion thereto, said drive train being mechanically independent of movement of the reciprocating mold plate during operation of both said shuttle and said patty-forming apparatus.

2. The system according to claim 1, wherein said precise position controlled motor comprises a servomotor.

3. The system according to claim 1 comprising a second precise position controlled motor and a second drive train, said second drive train driven by said second precise position controlled motor, said second drive train mechanically connected to said sheet transfer device to impart controlled motion thereto.

4. The system according to claim 3, wherein said first precise position controlled motor operates in reverse rotation directions.

5. The system according to claim 3, wherein said first precise position controlled motor comprises a servomotor.

6. A sheet interleaving module attachable to a patty-forming apparatus, comprising:
   a frame;
   a first motor mounted to said frame;
   a hopper holding sheets;
   a shuttle slidable from a sheet receiving position and a sheet dispensing position and having a sheet holding frame;
   a sheet transfer device having a suction device for gripping a sheet, said suction device moveable from a position to grip a sheet from the hopper to a position to place the sheet on the sheet holding frame; and
   a first drive train driven by said first motor, said first drive train mechanically connected to said shuttle to impart controlled motion thereto, said first motor driving the first drive train independently of the patty-forming apparatus during operation of both said sheet interleaving module and said patty-forming apparatus.

7. The system according to claim 6, wherein said frame includes two support rods arranged longitudinally extended and laterally spaced apart, said support rods protruding from said frame to be fastenable to a patty-forming apparatus to support said frame in cantilever fashion from the patty-forming apparatus.

8. The system according to claim 6, wherein said first motor is arranged having its axis horizontal and extended in a lateral direction.

9. The system according to claim 6, wherein said first drive train is connected to said sheet transfer device to impart controlled motion thereto.

10. A sheet interleave system for a patty-forming apparatus, comprising:
a frame;
a hopper holding sheets;
a shuttle slidable on said frame from a sheet-receiving position and a sheet-dispensing position and having a sheet-holding frame;
a sheet transfer device having a suction device for gripping a sheet, said suction device moveable from a position to grip a sheet from the hopper to a position to place the sheet on the sheet-holding frame;
a first precise position controlled motor; and
a first drive train driven by said precise position controlled motor, said drive train mechanically connected to said shuttle to impart controlled motion thereto;
wherein said apparatus comprises laterally arranged rods, said rods having protruding ends arranged to be attached to an adjacent patty-forming apparatus and to support the sheet interleave system in cantilever fashion, said rods also arranged to guide linear movement of said shuttle.

11. The system according to claim 10, wherein said shuttle is mounted on a pair of carriages, said carriages including two slide blocks, each slide block slidingly mounted on one rod.

12. A sheet interleave system for a patty-forming apparatus, comprising:
a frame;
a hopper holding sheets;
a shuttle slidable on said frame from a sheet-receiving position and a sheet-dispensing position and having a sheet-holding frame;
a sheet transfer device having a suction device for gripping a sheet, said suction device moveable from a position to grip a sheet from the hopper to a position to place the sheet on the sheet-holding frame;
a first precise position controlled motor; and
a first drive train driven by said precise position controlled motor, said drive train mechanically connected to said shuttle to impart controlled motion thereto;
wherein said motor comprises an output shaft and said first drive train comprises a drive pulley fixed to said output shaft, and a crank driven by said drive pulley, said crank pivotally connected to said frame at a first pivot, and said crank having a first portion extending from said first pivot and arranged to swing about said first pivot, said first portion connected to said shuttle, and a second portion extending from said first pivot and arranged to swing about said first pivot, said second portion connected to said suction device to impart controlled motion thereto.

13. The system according to claim 12, wherein said second portion carries a second pivot and said suction device is rotationally mounted to said second portion at said second pivot, and a drive arrangement connected between said frame and said suction device to swing said suction device about said second pivot simultaneously with pivoting of said second portion about said first pivot.

14. The system according to claim 13, wherein said drive arrangement comprises a stationary pulley fixed to said frame and a flip pulley fixed to said suction device and rotatable about said second pivot, and a belt wrapped around said stationary and flip pulleys, rotation of said second portion about said first pivot moving said belt over said flip pulley to rotate said suction device about said second pivot.

15. The system according to claim 14, wherein said first precise position controlled motor operates in reverse rotation directions.

16. The system according to claim 15, wherein said first precise position controlled motor comprises a servomotor.

17. The system according to claim 12, wherein said first portion comprises a third pivot and said shuffle carries a fourth pivot, and comprising a linkage pivotally connected to said third pivot and to said fourth pivot, pivoting motion of said first portion translating said shuffle linearly.

18. A sheet interleave system for a patty-forming apparatus, comprising:
a frame;
a hopper holding sheets;
a shuttle slidable on said frame from a sheet-receiving position and a sheet-dispensing position and having a sheet-holding frame;
a sheet transfer device having a suction device for gripping a sheet, said suction device moveable from a position to grip a sheet from the hopper to a position to place the sheet on the sheet-holding frame;
a first precise position controlled motor; and
a first drive train driven by said precise position controlled motor, said drive train mechanically connected to said shuttle to impart controlled motion thereto;
wherein said motor comprises an output shaft, and said drive train comprises a first pulley fixed to said output shaft and a crank pivotally mounted at a first pivot to said frame, said crank having a first portion swingable about said first pivot and having a distal end operatively connected to said shuttle, wherein said first portion comprises a second pulley fixed thereto, and a belt wrapped around said first and second pulleys, said motor rotating in oscillating fashion.

19. A sheet interleaving module attachable to a patty-forming apparatus, comprising:
a frame;
a first motor mounted to said frame;
a hopper holding sheets;
a shuttle slidable from a sheet receiving position and a sheet dispensing position and having a sheet holding frame;
a sheet transfer device having a suction device for gripping a sheet, said suction device moveable from a position to grip a sheet from the hopper to a position to place the sheet on the sheet holding frame;
a first drive train driven by said first motor, said first drive train mechanically connected to said shuttle to impart controlled motion thereto; and
a second motor and a second drive train, said second drive train driven by said second motor and mechanically connected to said sheet transfer device to impart controlled motion thereto.

20. A sheet interleave system for a patty-forming apparatus, comprising:
a frame;
a hopper holding sheets;
a shuttle slidable on said frame from a sheet-receiving position and a sheet-dispensing position and having a sheet-holding frame;
a sheet transfer device having a suction device for gripping a sheet, said suction device moveable from a position to grip a sheet from the hopper to a position to place the sheet on the sheet-holding frame;

a first precise position controlled motor;

a first drive train driven by said precise position controlled motor, said drive train mechanically connected to said shuttle to impart controlled motion thereto; and a second precise position controlled motor and a second drive train, said second drive train driven by said second precise position controlled motor, said second drive train mechanically connected to said sheet transfer device to impart controlled motion thereto;

wherein said second precise position controlled motor comprises an output shaft and said second drive train comprises a lever driven to pivot about a base pivot by said output shaft, said lever having a flip pivot at a distal end thereof, and a drive arrangement connected between said flip pivot and said frame to swing said suction device about said flip pivot simultaneously with pivoting of said lever about said base pivot.

* * * * *